(12) United States Patent
Mathauer et al.

(10) Patent No.: US 6,218,468 B1
(45) Date of Patent: Apr. 17, 2001

(54) PREPARATION OF AN AQUEOUS POLYMER DISPERSION BY THE FREE RADICAL AQUEOUS EMULSION POLYMERIZATION METHOD

(75) Inventors: Klemens Mathauer; Walter Mächtle, both of Ludwigshafen; Wolfgang Schrof, Neuleiningen; Horst Schuch, Ilvesheim; Timo Rager, Mainz; Wolfgang Meyer, Mainz; Gerhard Wegner, Mainz, all of (DE)

(73) Assignees: BASF Aktiengesellschaft, Ludwigshafen; Max-Planck-Institut, Mainz, both of (DE)

( * ) Notice: Subject to any disclaimer, the term of this patent is extended or adjusted under 35 U.S.C. 154(b) by 0 days.

(21) Appl. No.: 09/101,778

(22) PCT Filed: Jan. 23, 1997

(86) PCT No.: PCT/EP97/00308

§ 371 Date: Jul. 22, 1998

§ 102(e) Date: Jul. 22, 1998

(87) PCT Pub. No.: WO97/27222

PCT Pub. Date: Jul. 31, 1997

(30) Foreign Application Priority Data

Jan. 25, 1996 (DE) .............................. 196 02 538

(51) Int. Cl.⁷ .............................. C08L 53/02; C08F 2/08
(52) U.S. Cl. .............................. 525/88; 525/89; 525/241; 525/242; 525/243; 525/262; 525/445; 525/447; 525/451
(58) Field of Search ................ 525/88, 89, 241, 525/242, 243, 262, 445, 447, 451

(56) References Cited

U.S. PATENT DOCUMENTS

| | | |
|---|---|---|
| 3,251,905 | 5/1966 | Zelinski et al. |
| 3,390,207 | 6/1968 | Mose et al. |
| 3,598,887 | 8/1971 | Darcy et al. |
| 4,219,627 | 8/1980 | Halasa |
| 4,385,164 * | 5/1983 | Sinclair et al. ............. 526/201 |
| 5,416,145 | 5/1995 | Askeland et al. |
| 5,484,681 | 1/1996 | Cunningham et al. |

FOREIGN PATENT DOCUMENTS

| | | |
|---|---|---|
| 2 321 835 | 4/1973 | (DE) . |
| 0 040 419 | 5/1981 | (EP) . |
| 0 597 567 | 5/1994 | (EP) . |
| 0 665 240 | 1/1995 | (EP) . |

OTHER PUBLICATIONS

Encyclopedia of Polymer Science and Technology, vol. 5, Dielectric Heating to Emulsion, there is no date.
Polymer Preprints, Published by The Division of Polymer Chemistry, Inc. American Chemical Society, Apr. 1991.
Die Makromoleculare chemie, Macromolecular Symposia, Hartwig Hocker, R.E. Bareiss, W. Guth, B. Jung, I. Meisel, Huthig & Wepf Verlag, Basel, Heidelberg, New York, Makromol. Chem. Macromol. Symp. 58, 195–199 (1992).
Langmuir 1993, 9, 1741–1748, Hybridization of Block Copolymer Micelles, Minmin Tian, et al.
Polymer Preprints, vol. 29, No. 2, Spet. 1998, Published by The Division of Polymer Chemistry, Inc. American Chemical Society, Paper presented at the Los Angeles, CA Meeting.
Macromolecules, vol. 24, No. 19, Sep. 16, 1991, A. Pub. Of the American Chemical Society.
Macromolecules, vol. 27, No. 16, Aug. 1, 1994, Jin–Shan Wang, et al, by American Chemical Society, pps. pps., 4615–4620, and 4635–4638.
Macromolecules, vol. 24, No. 15, Jul. 22, 1991, A Publication of the American Chemical Society.

* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

In a process for the preparation of an aqueous polymer dispersion by the free radical aqueous emulsion polymerization method, the polymerization is carried out in the presence of frozen micelles of amphiphilic substances.

52 Claims, 4 Drawing Sheets

PREPARATION OF AN AQUEOUS POLYMER DISPERSION BY THE FREE RADICAL AQUEOUS EMULSION POLYMERIZATION METHOD

BACKGROUND OF THE INVENTION

1. Field of the Invention

The present invention relates to a process for the preparation of an aqueous polymer dispersion by polymerizing monomers having at least one vinyl group by the free radical aqueous emulsion polymerization method, in which an amphiphilic substance is added to the polymerization vessel before and/or during the polymerization.

2. Description of the Background

Aqueous polymer dispersions (latices) are generally known. They are fluid systems which contain, as the disperse phase in an aqueous dispersing medium, polymer coils (i.e. polymer particles) consisting of a plurality of intertwined polymer chains.

The diameter of the polymer particles is frequently from 10 to 2000 nm.

As in the case of polymer solutions on evaporation of the solvent, aqueous polymer dispersions have the potential to form polymer films on evaporation of the aqueous dispersing medium, and they are therefore used in particular as binders, for example for paints or for materials for coating leather, paper or plastics films. They are becoming increasingly important owing to their environmentally friendly properties.

An important feature of aqueous polymer dispersions is the diameter of the polymer particles present as the disperse phase, since the size of the polymer particles or their size distribution plays a role in determining a number of performance characteristics of aqueous polymer dispersions. For example, films of finely divided aqueous polymer dispersions have high gloss (cf. for example, Progress in Organic Coatings 6 (1978), 22). Furthermore, the power of finely divided aqueous polymer dispersions to penetrate into porous but relatively dense substrates, such as paper, leather or a render surface is greater than that of coarse-particled aqueous polymer dispersions (for example, Dispersionen synth. Hochpolymerer, Part II, Anwendung, H. Reinhard, Springer-Verlag, Berlin (1969), page 4).

On the other hand, coarse-particled aqueous polymer dispersions have, for example, lower flow resistance than finely divided aqueous polymer dispersions, the composition and solids concentration otherwise being identical (for example, Dispersionen synth. Hochpolymerer, Teil II, Anwendung, H. Reinhard, Springer-Verlag, Berlin (1969), page 5). Aqueous polymer dispersions whose polymer particle diameters are distributed over a relatively large diameter range also have advantageous flow behavior (cf. for example, DE-A 42 13 965).

Establishing the diameters of the dispersed polymer particles in a controlled, reproducible manner tailored to the particular intended use is therefore of key importance in the preparation of an aqueous polymer dispersion.

The most important method for the preparation of aqueous polymer dispersions is the free radical emulsion polymerization method, in particular the free radical aqueous emulsion polymerization method.

In the latter method, monomers having at least one vinyl group are usually subjected to free radical polymerization under the action of free radical polymerization initiators dissolved in the aqueous medium, to give polymer particles present directly as the disperse phase in the aqueous dispersing medium. The aqueous polymer dispersions prepared by the free radical aqueous emulsion polymerization method are usually referred to as aqueous primary dispersions, in order to distinguish them from the aqueous secondary dispersions. In the case of the latter, the polymerization is carried out in a nonaqueous medium. Dispersing in the aqueous medium is not effected until after the polymerization reaction is complete.

The monomers to be polymerized are distributed in the form of droplets (the droplet diameter is frequently from 2 to 10 $\mu$m) in the aqueous medium with formation of an aqueous monomer emulsion. However, these monomer droplets are not the sites of the polymerization but act merely as a monomer reservoir. Rather, the polymerization sites are formed in the aqueous phase, which always contains a limited amount of the monomers to be polymerized and the free radical polymerization initiator in dissolved form. Chemical reaction of these reactants present in solution results in the formation of oligomer radicals, which are precipitated as primary particles above a critical chain length (homogeneous nucleation). The formation of primary particles presumably takes place up to the point at which the rate of formation of the free radicals in the aqueous phase is equal to the rate of their disappearance due to free radical capture by polymer particles already formed. This polymer particle formation phase is then followed by the polymer particle growth phase, i.e. the monomers to be polymerized diffuse from the monomer droplets acting as a reservoir, via the aqueous phase, to the primary particles formed (whose number and surface area are very much greater than those of the monomer droplets), in order to be incorporated into said primary particles by polymerization (cf. for example, Faserforschung und Textiltechnik 28 (1977), Part 7, Zeitschrift für Polymerforschung, page 309). By controlled addition of suitable dispersants, both the disperse phase of the monomer droplets and the disperse phase of the polymer particles formed are, if required, stabilized.

While the process of polymer particle growth usually takes place systematically, the polymer particle formation is essentially a stochastic process, i.e. the number of primary polymer particles formed and hence the diameters of the final polymer particles resulting after the end of the polymerization fluctuate from polymerization batch to polymerization batch. The product quality fluctuates in a corresponding manner (identical reproduction is usually not possible). This applies very particularly in the case of a high solids volume content ($\geq$50 Vol.-%) of the aqueous polymer dispersion, since, for example, the viscosity of highly concentrated aqueous polymer dispersions is particularly sensitive to the number and size of the polymer particles contained in dispersed form.

It is known that a controlled free radical aqueous emulsion polymerization procedure is possible by initiating it in the presence of a surfactant dissolved in the aqueous medium, the surfactant content of the aqueous medium being such that it is above the critical micelle formation concentration of said medium (cf. for example, High Polymers, Vol. IX, Emulsion Polymerization, Interscience Publishers, Inc., New York, Third Printing, 1965, page 1 et seq.).

The term surfactant means amphiphilic substances which, on dissolution in water, are capable of reducing the surface tension a of pure water significantly (as a rule by at least 25%, based on the a value of pure water) before reaching the critical micelle formation concentration.

The term "amphiphilic" indicates that surfactants have both hydrophilic and hydrophobic groups. Hydrophilic groups are those which are drawn into the aqueous phase, whereas hydrophobic groups are forced out of the aqueous phase.

In highly dilute aqueous solutions, surfactants are therefore present essentially independent molecules in solution, their amphiphilic structure resulting in accumulation at the water surface with oriented adsorption, which reduces the surface tension.

In concentrated aqueous solutions, on the other hand, surfactants are present predominantly as micelles in solution, i.e. the surfactant molecules are arranged in the aqueous solution predominantly in a state of relatively high aggregation, i.e. as micelles, in which they are oriented in such a way that the hydrophilic groups face the aqueous phase and the hydrophobic groups point toward the interior of the micelle. As the surfactant concentration increases further, essentially only the number of micelles per unit volume increases, but not the number of surfactant molecules dissolved in molecular form per unit volume.

The transition from the aqueous molecular solution to the aqueous micellar solution usually takes place relatively abruptly, as a function of the surfactant concentration, which is evident from correspondingly abrupt changes in the concentration dependence of many macroscopic properties (for example the surface tension) and defines the critical micelle formation concentration (usually stated as molar concentration c.m.c.) (inflexional point in the concentration dependence of the property). At concentrations above the critical micelle formation concentration, the term micellar solutions is used. Here, the term solution is intended to express the fact that the visual appearance of a micellar aqueous surfactant solution, like that of a molecular aqueous surfactant solution, is the same as that of a clear aqueous solution. The relative molecular weight of surfactants is usually <2000, and there is usually a rapid exchange (a dynamic equilibrium) in their micellar aqueous solutions between the various surfactant fractions present in solution in molecular and micellar form.

The following are typical examples of surfactants (source: Ull-manns Encyclopädie der technischen Chemie, Verlag Chemie, 4th edition, Vol. 22, page 456 et seq.):

a) Perfluorononanecarboxylic acid (c.m.c. at 20° C. and 1 atm in water=$10^{-5}$ mol/l; $\sigma$ of the substituted aqueous solution=20 mN/m);

b) Sodium 1-decyl sulfate (c.m.c. at 20° C. and 1 atm in water=$3.4 \cdot 10^{-2}$ mol/l; $\sigma$ of the associated aqueous solution=40 mN/m).

The surface tension of pure water at 20° C. and 1 atm is 73 mN/m.

It is now generally assumed that the surfactant micelles present in an aqueous medium are nucleation centres for the formation of primary polymer particles (the term micellar nucleation is also used). If the free radical aqueous emulsion polymerization is initiated, for example, in the presence of a large number of surfactant micelles, many small final polymer particles are obtained, whereas initiation in the presence of a small number of surfactant micelles gives a few large polymer particles. At the same time, the surfactant generally reduces both the polymer particle/aqueous medium interfacial tension and the monomer droplet/aqueous medium interfacial tension and is thus capable of stabilizing the particular disperse phase as a dispersant, which has an advantageous effect on the free radical aqueous emulsion polymerization. On the other hand, the decrease in surface tension is usually disadvantageous, said decrease being caused by the surfactant and increasing the tendency to foam formation.

While the validity of the abovementioned relationships may be satisfactory qualitatively (smaller polymer particles are obtained with increasing amount of surfactant, and vice versa; cf. Dispersionen synthetischer Hochpolymerer, Part I, F. Holscher, Springer-Verlag, Berlin (1969), page 81), the quantitative relationship is as a rule just as unsatisfactory as the reproducibility.

EP-B 40 419 (e.g. page 5, line 16 et seq. and Example 1), DE-A 23 21 835 (e.g. page 14, line 9 et seq.) and Encyclopedia of Polymer Science and Technology, Vol. 5, John Wiley & Sons Inc., New York (1966), page 847, therefore recommend that, for establishing the final polymer particle size in a controlled manner, the polymer particle formation phase should be separated from the polymer particle growth, i.e. a defined amount of a separately preformed aqueous polymer dispersion (nuclear or seed polymer dispersion) is added, for example before the beginning of the free radical aqueous emulsion polymerization, and the polymer particles contained in this seed are allowed only to grow in the course of the actual free radical aqueous emulsion polymerization. The diameter of the seed polymer particles and the ratio of initially taken seed polymer particles and monomers to be polymerized essentially determine the size of the final polymer particles in the resulting aqueous polymer dispersion. The more finely divided the seed and the greater the amount of seed used, the smaller are the resulting final polymer particles for a given amount of monomer. If a broad distribution of the diameters of the polymer particles is desired, additional seed polymer dispersion is added to the polymerization vessel also during the free radical aqueous emulsion polymerization of the monomers. In this way, the resulting aqueous polymer dispersion comprises various generations of seed polymer particles grown to different final sizes. A similar effect can also be obtained by initiating the formation of new micelles in the course of the free radical aqueous emulsion polymerization of the monomers by adding a larger amount of surfactant.

However, the disadvantage of the free radical aqueous emulsion polymerization method with the addition of an aqueous seed polymer dispersion is that the aqueous seed polymer dispersion has to be stored prior to its use, which frequently entails problems owing to the basic sensitivity of aqueous polymer dispersions (the subsequent attempt to reduce their interface) to frost, shearing, superficial drying and vibration. Moreover, identical product preparation at different production locations requires the corresponding identical availability of such an aqueous seed polymer dispersion. An additional problem is the production of an aqueous seed polymer dispersion in a reproducible manner.

SUMMARY OF THE INVENTION

It is an object of the present invention to provide a process for the preparation of an aqueous polymer dispersion by polymerizing monomers having at least one vinyl group by the free radical aqueous emulsion polymerization method, which process permits the free radical aqueous emulsion polymerization to be carried out in a controlled manner qualitatively comparable with the seed procedure, but does not have the disadvantages of seed storage.

BRIEF DESCRIPTION OF THE DRAWINGS

FIG. 4B illustrates a plot of reciprocal values as a function of concentration to give a relative $M_w$ of the migrating unit of 600000±25% on linear extrapolation to the concentration 0.

DETAILED DESCRIPTION OF THE PREFERRED EMBODIMENTS

Figure 1:
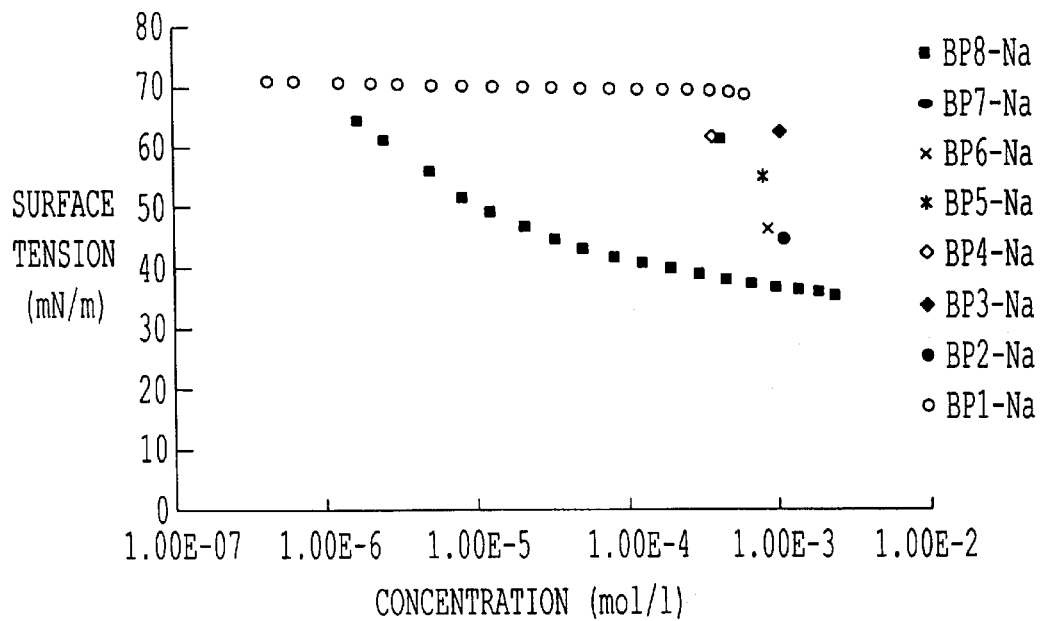
FIG. 1 illustrates a graphical plot of surface tension versus concentration for micellar aqueous solutions of the sodium salts of the two-block copolymers of the present invention.

We have found that this object is achieved by a process for the preparation of an aqueous polymer dispersion by polymerizing monomers having at least one vinyl group by the free radical aqueous emulsion polymerization method, in which an amphiphilic substance is added to the polymerization vessel before and/or during the polymerization, wherein 1 l of water at 20° C. and 1 atm is capable of taking up at least $10^{-4}$ mol of the amphiphilic substance in micellar solution;

the critical micelle formation concentration of the amphiphilic substance at 20° C. and 1 atm in water is $<10^{-6}$ mol/l and the surface tension a of an aqueous molecular and/or micellar solution of the amphiphilic substance in the molar concentration range $(0<C_M<10^{-4})$mol/l at 20° C. and 1 atm does not fall below 60 mN/m.

The c.m.c. of the amphiphilic substance to be used according to the invention, at 20° C. and 1 atm in water, is preferably $\leq 10^{-6.25}$, preferably $\leq 10^{-6.5}$, particularly preferably $\leq 10^{-6.75}$, more preferably $\leq 10^{-7.0}$, very particularly preferably $\leq 10^{-7.25}$, even more preferably $\leq 10^{-7.5}$, mol/l.

It is also advantageous if the surface tension σ of an aqueous molecular and/or micellar solution of the amphiphilic substance to be used according to the invention, in the molar concentration range $(0<C_M\leq 10^{-4})$mol/l, at 20° C. and 1 atm, does not fall below 62.5, preferably 65, particularly preferably 67,5, very particularly preferably 70, even more preferably 71.5, mN/m. Preferably, the surface tension does not fall below the abovementioned values even when a molar concentration of $10^{-3}$ mol/l is reached.

It is furthermore advantageous if the amphiphilic substance to be used according to the invention is such that 1 l of water at 20° C. and 1 atm is capable of taking up at least $10^{-3}$, preferably at least $10^{-2}$, particularly preferably at least $10^{-1}$, mol or 1 mol of the amphiphilic substance in micellar solution.

The present invention is based on the observation that not only surfactants, i.e. lower molecular weight amphiphilic substances which are capable of significantly reducing the surface tension of water, are capable of forming micellar aqueous solutions above a c.m.c., but that this property can also be attributed essentially very generally to amphiphilic substances.

The c.m.c. is essentially determined by the type of hydrophobic groups of the amphiphilic substance, within a homologous series the c.m.c. assuming lower values with increasing extent (e.g. increasing length (number of carbon atoms) of the alkyl group) of the hydrophobic group. The effect of the hydrophilic group on the c.m.c. is accordingly comparatively small.

At the same time, the rate of exchange between the different fractions dissolved in molecular or micellar form in aqueous micellar solutions of amphiphilic substances decreases with increasing length of the hydrophobic group, which may result in the dynamic equilibrium state between the different fractions being reached only after a relatively long time or only at elevated temperatures. As a rule, this is accompanied by a decrease in the fraction dissolved in molecular form in the equilibrium state, which is evident from a lesser ability to reduce the surface tension.

The possible explanation for the abovementioned observations is that the increase in the attractive interaction of the hydrophobic groups with one another as their length increases is greater than the increase in their attractive interaction with the aqueous phase, and it is for this reason that, with increasing length, they are increasingly displaced from the aqueous phase and forced into aggregation (micelle formation) (with increasing residence time therein). The type of hydrophilic group essentially decides only whether the aggregate can be held in solution or not.

In other words, the amphiphilic substances to be added according to the invention are those whose fraction dissolved in molecular form in their micellar aqueous solution is particularly small and in which the exchange between the various fractions dissolved in micellar and molecular form in their micellar aqueous solutions takes place particularly slowly (increased kinetic stability).

Our investigations have shown that micellar aqueous solutions of the amphiphilic substances to be added according to the invention are particularly suitable as nucleation centres of the controlled free radical aqueous emulsion polymerization of monomers having at least one vinyl group.

The difference compared with the micellar aqueous solutions of the classical surfactants is presumably the following. If the formation of polymer particles is initiated in some micelles at the beginning of the free radical aqueous emulsion polymerization in the presence of classical aqueous micellar systems, other micelles not yet initiated begin to disintegrate (owing to the rapid exchange) in order to support the stabilization of the surface of the growing polymer particles, with the result that the quantitative relationship between the number of micelles originally present and the number of polymer particles formed is lost.

With increasing kinetic stability of the micelles, the phenomenon of micellar disintegration decreases in the course of the formation of the polymer particles, and the polymer particle formation phase increasingly approaches the limiting case where each micelle originally present becomes the nucleation centre of a polymer particle (as a rule, the stability of the micelles to the addition of foreign electrolyte also increases with increasing kinetic stability of the micelles). In other words, as the kinetic micellar stability increases, an aqueous micellar solution becomes increasingly capable of affecting the course of free radical aqueous emulsion polymerization in the same way as an aqueous seed polymer dispersion. In contrast to the latter, however, it can be produced in a reproducible manner and stored in the dry state, which avoids the disadvantages of storing a seed polymer dispersion.

In the simplest case, the desired micellar effect of the amphiphilic substance to be added according to the invention can be produced in the course of free radical aqueous emulsion polymerization by adding the amphiphilic substance to the aqueous polymerization medium as such in an amount above the c.m.c. As a rule, however, the amphiphilic substance to be added according to the invention is added in the form of a preformed micellar solution (suitable solvents are both water and a water-miscible organic solvent or a mixture of water and such a solvent).

This applies in particular when the amphiphilic substance is not capable of directly forming an aqueous micellar solution with water under standard temperature and pressure conditions (20° C., 1 atm). In these cases, it is frequently possible to prepare a micellar aqueous solution by first dissolving the amphiphilic substance to be added according to the invention in a water-miscible organic solvent or in a mixture of water and such an organic solvent to give a molecular and/or micellar solution (for example, in dioxane, tetrahydrofuran or mixtures thereof with water) and then converting this molecular and/or micellar solution (which, according to the invention, can also frequently be added directly to the aqueous polymerization medium), for example by means of dialysis or repeated additions of small amounts of water and subsequent removal of the organic solvent used by distillation, into an aqueous micellar solution (instead of water, an aqueous solution of an acid and/or base is also frequently used) and, if required, concentrating said solution by evaporating water. Such aqueous micellar solutions produced at 1 atm and 20° C. are as a rule not in thermodynamic equilibrium. However, they usually have higher kinetic stability, i.e. the micelles contained therein in dissolved form behave like quasi-molecular structures between which there is virtually no more exchange. The average residence time of an amphiphilic molecule in such micelles may be several hours or days, even at elevated temperatures. To what extent such aqueous micellar solutions have a c.m.c. at all is often unclear. If they do, it is at very low concentrations. Such aqueous micellar solutions which can normally be produced only by an indirect method and are not in thermodynamic equilibrium are frequently referred to in the literature as solutions of frozen micelles (cf. for example, Polymer Preprints 32 (1) (1991), 525, Makromol. Chem. Macromol. Symp. 58 (1992), 195–199, or Langmuir 9 (1993), 1741–1748). As a rule, they do not change their macroscopic appearance over several days (at 20° C. and 1 atm). Aqueous micellar solutions of corresponding kinetic stability are rather seldom obtainable by directly dissolving amphiphilic substances.

In particular, aqueous solutions of frozen micelles of amphiphilic substances to be added according to the invention can be used instead of aqueous seed polymer dispersions for controlled free radical aqueous emulsion polymerizations (they may be added as such or, under certain circumstances, also produced in situ in the aqueous polymerization medium by adding, for example, a solution of the amphiphilic substance to be added according to the invention in a water-miscible organic solvent to the aqueous polymerization medium). By diluting aqueous solutions of frozen micelles, it is possible, owing to their kinetic stability, to produce aqueous micellar solutions whose concentration of amphiphilic substance is below their c.m.c. and to use these solutions according to the invention.

The surface tension of the aqueous solutions is as a rule not a suitable measured quantity for determining the c.m.c., at very low concentrations in aqueous solution, of the amphiphilic substances to be added according to the invention.

The c.m.c. data used in this publication therefore relate to investigations of the concentration dependence of the scattering behavior (Classical Light Scattering From Polymer Solutions, Pavel Kratochvil, Elsevier, New York (1987), in particular Section 2.1.2) of the relevant aqueous solutions (classical light scattering; Price, C., Pure Appl. Chem. 55 (1983), 1563; Price, C.; Chan, E. K. M.; Stubbersfield, R. B., Eur. Polym. J. 23 (1987), 649, and Price, C.; Stubbersfield, R. B.; El-Kafrawy, S.; Kendall, K. D., Br. Polym. J. 21 (1989), 391) or, if the sensitivity of this method of investigation is insufficient, to investigations of the fluorescence behavior of hydrophobic dyes, such as Fluorol® 7GA or pyrene, which accumulate in the hydrophobic inner region of the micelles and alter their fluorescence behavior (Zhao, C. L.; Winnik, M. A.; Riess, G.; Croucher, M. D., Langmuir 6 (1990), 514; Wilhelm, M.; Zhao, C. L.; Wang, Y.; Xu, R.; Winnik, M. A., Macromolecules 24 (1991), 1033; Astafieva, I.; Zhong, X. F.; Eisenberg, A., Macromolecules 26 (1993), 7339, and Astafieva, I.; Khongaz, K.; Eisenberg, A., Macromolecules 28 (1995), 7127).

Block polymers in which at least one of the blocks present (hydrophilic group) is readily water-soluble as an independent polymer and at least one other of the blocks present (hydrophobic group) is only slightly water-soluble as an independent polymer form a particularly clear type of amphiphilic substances.

The statements made so far are therefore illuminating in a particularly evident way on the basis of a closer consideration of such amphiphilic block polymers, in particular in the case of the two-block polymers.

The term block polymer refers to polymers whose molecules (instead of the term molecule, the literature also frequently uses the more general term unimer in connection with micelle-forming amphiphilic substances, in order to distinguish the individual species from their micellar aggregation, since strictly the term molecule does not include, for example, polyelectrolyte types) consist of preferably linear, linked blocks, the blocks being bonded to one another directly or by constitutional units which are not part of the blocks, and the term block meaning a segment of a polymer molecule (unimer) which comprises a plurality of identical constitutional units and has at least one constitutional or configurative feature which does not occur in the directly adjacent segments. Two-block polymers accordingly consist of two blocks.

Block polymers are obtainable in a simple manner by first linking one type of monomeric building blocks successively in series, then continuing this linkage with another type of monomeric building blocks, subsequently carrying out further changes of the monomeric building block type if necessary, and thus producing two- or three-block polymers or polymers having a larger number of blocks as required. Starting from monomeric building blocks having at least one vinyl group, the linkage can be effected both within the individual block and between the blocks, for example in a manner known per se by initiated polymerization (keyword: living polymers; cf. for example, Ullmanns Encyklopädie der technischen Chemie, Vol. 13, 4th edition, Verlag Chemie, New York, page 599). The initiated polymerization is designed in a manner known per se so that, after one monomer type has been completely consumed, macroinitiators which are still active or can be reactivated by suitable measures are obtained and continue to grow after the addition of the next monomer type, until their activity is deliberately terminated by the addition of suitable inhibitors.

A particularly frequently used method for such initiated sequential polymerization is sequential anionic polymerization (cf. for example, U.S. Pat. No. 3,251,905; U.S. Pat. No. 3,390,207; U.S. Pat. No. 3,598,887; U.S. Pat. No. 4,219,627; Macromolecules 27 (1994), 4908; Polymer, 32 Number 12 (1991), 2279; Macromolecules 27 (1994), 4615; Macromolecules 27 (1994), 4635, and Macromolecules 24 (1991), 4997). In the same way as the free radical polymerization, it takes place according to a chain reaction scheme. However, it is not an initiator radical which functions as the initiator but an initiator anion, which donates its charge to the growing macromolecule, which in turn is thus capable of acting as an initiator anion and continuing to grow. If the initiation reaction takes place very rapidly in comparison with the growth reaction, very narrow molecular weight distributions are obtainable.

If a monomer having at least one ethylenically unsaturated group is not capable of anionic polymerization, the procedure can be modified so that polymerization can be continued by, for example, a free radical or cationic methods. The possibilities for transferring from anionic polymerization to growth mechanisms otherwise initiated are described, for example, in P. Rempp, E. Franta and J. E. Herz, Advances in Polymer Science 1988, pages 164–168.

However, it is also possible to connect blocks produced by anionic polymerization to blocks which are obtainable only by polycondensation or polyaddition of monomeric building blocks (e.g. polyesters or polyurethanes), by, for example, adding an anionically produced block, provided with a suitable functional terminal group, during a polycondensation (e.g. R. N. Young, R. P. Quirk and L. J. Fetters, Advances in Polymer Science, 56 (1984), 70). Wilhelm, M. et al., Macromolecules 24 (1991), 1033, relates to, for example, polystyrene/polyethylene oxide two-block polymers. The preparation of block polymers by free radical polymerization with the aid of functional initiators or macroinitiators is described, for example, in B. Riess, G. Hurtrez and P. Bahadur in "Encyclopedia of Polymer Science and Engineering", Vol. 2, 327–330, Wiley & Sons (1985).

U.S. Pat. No. 4,581,429, U.S. Pat. No. 5,322,912 and U.S. Pat. No. 5,412,047 describe the preparation of block polymers via pseudo-living free radical polymers. This procedure is essentially applicable to all monomers having at least one ethylenically unsaturated group and also permits the preparation of block polymers having a particularly uniform molecular weight.

Of course, block polymers can be converted into other block polymers by subsequent chemical reactions (for example, polymer-analogous reactions). Polymer Preprints (Am. Chem. Soc. Div. Polym. Chem.) 29 (1988), 425–426, relates to, for example, two-block polymers which are obtainable by anionic sequential polymerization of first an alkyl ester of methacrylic acid and then glycidyl methacrylate and subsequent conversion of the oxiranyl groups into β-hydroxysulfonate groups. Macromolecules 26 (1993), 7339–7352, discloses, for example, the preparation of polystyrene/polyacrylic acid two-block polymers by hydrolysis of polystyrene/poly(tert-butyl acrylate) two-block polymers.

In general, separately preprepared polymeric blocks can be linked when they have suitable functional terminal groups. Thus, EP-A 665 240 describes, for example, polymethacrylate/polymethacrylic acid two-block polymers in which the two blocks are linked by a constitutional unit

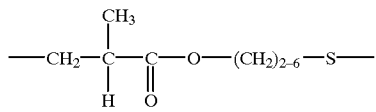

If the various blocks of constitutional units which may link with one another, and initiator radicals, if required moderator radicals and terminating radicals, are neglected, it is possible to represent block polymers in a simple manner by placing the basic unit of the respective block in square brackets and indicating by means of a number attached outside the square brackets the number of times the respective block contains the basic unit linked to itself. The preparation of the block as a function of time can be reproduced by the sequence of square brackets.

It is generally known that amphiphilic block polymers dissolved in water are capable of acting like classical surfactants if the hydrophobic and hydrophilic blocks contained are of suitable length, and it is for this reason that they are also referred to as polymeric surfactants and are recommended, inter alia, as dispersants for stabilizing aqueous polymer dispersions.

EP-A 665 240 recommends, for example, two-block polymers

[alkyl methacrylate]$_r$ [methacrylic acid]$_s$ where r and s are each from 4 to 20, as dispersants in aqueous polymer dispersions. This recommendation is repeated by the applicant of EP-A 665 240 in its company brochure 17-1784-92/5D. A comparable recommendation is given in Proc. Int. Org. Coat. Sci. Technol. 20th (1994), 511–518.

Polymer Preprints (Am. Chem. Soc. Div. Polym. Chem.) 29 (1988), 425–426, recommends two-block polymers

[alkyl methacrylate/α-methylstyrene]$_p$ [sulfonated glycidyl methacrylate]$_q$ where p is <20, as dispersant in aqueous polymer dispersions.

Macromolecules 24 (1991), 5922–5925, shows that, when an aqueous solution of abovementioned two-block polymers is added to an aqueous standard polymer dispersion (a mixture of 20 g of ethyl acrylate, 80 g of water, 100 mg of $K_2S_2O_8$ and 0.02 g of sodium oleyl tauride sulfonate is initially taken in a polymerization vessel with stirring (150 revolutions per minute) and freed from oxygen by means of a stream of nitrogen; the mixture is then heated to 80° C. and is polymerized for 30 minutes while maintaining this temperature and continuing the stirring; the resulting mean polymer particle diameter is 80 nm (photon correlation spectroscopy), the two-block polymer is rapidly attracted to the surface of the disperse polymer particles (increase in the hydrodynamic radius of the disperse polymer particles, determined by means of photon correlation spectroscopy) and permits restabilization of the disperse phase.

According to the invention, however, what is particularly preferred is the addition of those amphiphilic substances which, when added as a $10^{-3}$ molar micellar aqueous solution to the abovementioned aqueous standard polymer dispersion (in a total amount of 3% by weight, based on dispersed polymer, of amphiphilic substance) at 20° C. and 1 atm with moderate stirring (5 revolutions per minute) in the course of 15, preferably 30, minutes, particularly preferably in the course of 1 hour, very particularly preferably in the course of 5, more preferably 10, especially 20, hours, do not result in any increase in the hydrodynamic radius of the dispersed standard polymer particles, i.e. according to the invention the dispersing effect of the amphiphilic substance to be added is only of minor importance.

Advantageous substances to be added according to the invention are accordingly those in whose micellar aqueous solutions in a concentration range from $10^{-4}$ to $10^{-3}$ mol/l (where obtainable) at 20° C. and 1 atm the average residence time of a unimer within a micelle is at least 15, preferably at least 30, minutes, particularly preferably at least 1 hour, very particularly preferably at least 5, more preferably at least 10, especially at least 20, hours (free radical aqueous emulsion polymerizations are generally carried out at from 0 to 100° C.; of course, the temperature influences the kinetics of micellar systems; however, the temperature effect in the case of the abovementioned systems is not so pronounced that a standardization according to the invention to 20° C. would no longer be justified).

The average residence time of a unimer in a micelle can be determined in a manner known per se, for example by marking an amphiphilic unimer type in two different ways, preparing from the differently marked unimers two separate aqueous micellar solutions which contain the micelles marked in correspondingly different ways, mixing these solutions with one another and then observing the time-dependent establishment of an aqueous micellar solution of micelles having mixed marking.

A simple possible method of marking comprises covalently marking the hydrophobic group with two fluorophores which differ from one another, the two fluorophores being chosen so that, when they approach to a distance of $\leq 10$ nm, the decay in the fluorescence of one fluorophore (donor) due to nonradiant energy transfer (Forster transfer) to the other fluorophore (acceptor) is shortened.

If a micellar solution whose unimers are exclusively donor-marked in the abovementioned manner and an aqueous micellar solution whose unimers are exclusively acceptor-marked in the abovementioned manner are prepared and the two solutions are then mixed, unimer exchange gives micelles which contain both donor-marked and acceptor-marked unimers and do so at a distance of <10 nm, since the hydrophobic groups point into the interior of the micelles. The time-dependent change in the decay of fluorescence of the donor fluorophore as a function of this exchange gives the average residence time in a manner known per se.

The end value of the time-dependent decay in fluorescence can be determined by first dissolving a mixture of donor-marked and acceptor-marked unimers in an organic solvent, separating off the solvent, for example by distillation and producing the required aqueous micellar solution from the resulting powder, the micelles of which solution then contain from the outset both donor-marked and acceptor-marked unimers (cf. Förster, Zeitschrift fur Naturforschung, A4 (1949), 321; The synthesis of polymers bearing terminal fluorescent and fluorescence-quenching groups in Macromol. Chem. 191 (1990), 3069; Langmuir 1993, 1741–1748; Macromol. Chem. Macromol. Symp. 58 (1992), 195–199; Collect. Czech Chem. Commun. 58 (1993), 2362; Macromolecules 25 (1992), 461–469).

Another possible method of marking is isotopic marking, which results in unimers or micelles having different masses. The measured quantity used in this case may be, for example, one which is dependent on the mass. A measured quantity of this type which is suitable for the micellar aqueous solutions of the amphiphilic substances to be added according to the invention is in particular the migration rate in a centrifugal field of the analytical ultracentrifuge (AUC). If, in addition to unimers, the micellar aqueous solution contains, for example, two micellar types, the AUC sedimentation (for example, W. Machtle in S. E. Harding et al. (Ed.) Analytical Ultracentrifugation in Biochemistry and Polymer Science, Royal Society of Chemistry, Cambridge, England (1992), chapter 10, 147; Langmuir 9 (1993), 1741–1748 and Macromol. Chem. Macromol. Symp. 58 (1992), 195–199) has two schlieren peaks corresponding to the two micellar types, the area under the respective peak being proportional to the absolute amount in each case. If the two micellar types of different mass now fuse as a function of time to give one micellar type of average mass, the two abovementioned schlieren peaks disappear as a function of time and a third schlieren peak appears. The time characteristic gives the desired average residence time in a manner known per se.

Furthermore, the AUC sedimentation run is capable of showing the fraction dissolved in unimer form in the micellar aqueous solutions of the amphiphilic substances to be added according to the invention.

According to the invention, it is preferable to add amphiphilic substances in whose micellar aqueous solutions in the concentration range from $10^{-4}$ to $10^{-3}$ mol/l (if accessible) at 20° C. and 1 atm the fraction dissolved in unimer form is $\leq 5$, preferably $\leq 3$, particularly preferably $\leq 1$ or $\leq 0.5$, % by weight, based on the total amount of amphiphilic substance contained in dissolved form.

Furthermore, the AUC sedimentation diffusion equilibrium method (cf. W. Mächtle in Makromol. Chem., Rapid Commun. 13 (1992), 555–563, permitted determination of the weight average molecular weight of the micellar aggregates contained under a schlieren peak.

Starting from the amphiphilic block polymers recommended in the prior art as dispersants for aqueous polymer dispersions, amphiphilic substances to be added according to the invention are obtainable by increasing the number of basic units contained in the hydrophobic blocks (the length of the hydrophobic block) and at the same time establishing the length of the hydrophobic blocks so that they permit the dissolution of the micellar aggregate.

According to the invention, the associated loss of surfactant activity is essentially insignificant since the object according to the invention is the use as a quasi-aqueous seed polymer dispersion.

The dominant effect of the length of the hydrophobic block is evident, for example, from the c.m.c. of aqueous solutions of two-block polymers of the general formula

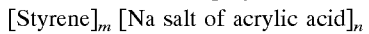

If n is chosen as 1000 and at the same time m is increased from 6 to 110, the c.m.c. in aqueous solution at 20° C. and 1 atm decreases by a factor of about 300.

If, on the other hand, m is chosen as 110 and n is varied in the range from 300 to 1400, the c.m.c. in aqueous solution at 20° C. and 1 atm does not even change by a factor of about 2. It is striking that, for a constant value of n=1000, the c.m.c. decreases particularly dramatically on changing m from 6 to 30, while at $m \geq 40$ the c.m.c. scarcely decreases with increasing m. This finding is of interest in that our own investigations have shown that the transition to micellar aqueous solutions of frozen micelles takes place at $m \geq 30$.

Essentially similar results are obtained for two- or three-block polymers

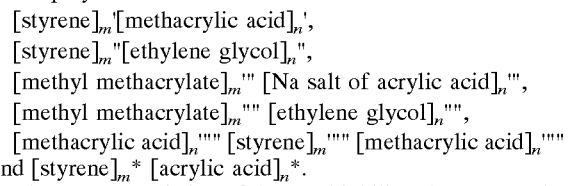

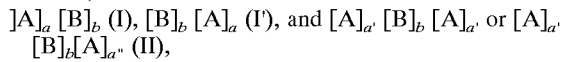

The group consisting of the amphiphilic substances to be added according to the invention therefore includes in particular two- and three-block polymers of the general formulae I, I' and II $]A]_a [B]_b$ (I), $[B]_b [A]_a$ (I'), and $[A]_{a'} [B]_b [A]_{a'}$ or $[A]_{a'} [B]_b [A]_{a''}$ (II), where B is a basic unit selected from the group consisting of styrene, methylstyrene, chlorostyrene, vinyl esters of $C_1$–$C_8$-alkanecarboxylic acids, esters of an α,β- monoethylenically unsaturated carboxylic acid of 3 to 6 carbon atoms and a $C_1$- to $C_8$-alkanol, butadiene and ethylene and A(A') is a basic unit selected from the group consisting of α,β-monoethylenically unsaturated mono- and dicarboxylic acids of 3 to 6 carbon atoms, 2-acrylamido-2-methylpropanesulfonic acid, styrenesulfonic acid, vinylsulfonic acid and the alkali metal (in particular Na and K) and ammonium salts of the abovementioned acids, N-vinylpyrrolidone, vinyl alcohol, ethylene glycol and propylene glycol.

Of course, both the A(A') and the B block may be copolymers having a corresponding degree of polymerization and comprising the monomers of the respective group (this statement also relates to the groups singled out below as being preferred).

B is preferably a basic unit selected from the group consisting of styrene, methylstyrene, chlorostyrene, vinyl acetate, vinylpropionate, methyl acrylate, ethyl acrylate, n-butyl acrylate, 2-ethylhexyl acrylate and methyl methacrylate.

B is particularly preferably a basic unit selected from the group consisting of styrene, methyl methacrylate, n-butyl acrylate and 2-ethylhexyl acrylate. The B block is very particularly preferably composed of styrene and/or methyl methacrylate.

A(A') is preferably a basic unit selected from the group consisting of acrylic acid, methacrylic acid, vinylsulfonic acid, 2-acrylamido-2-methylpropanesulfonic acid and the Na, K and $NH_4$ salts of these acids.

The A(A') block is particularly preferably composed of acrylic acid, methacrylic acid and/or the K, Na and $NH_4$ salts thereof.

b is, as a rule, an integer $\leq 30$, preferably $\geq 35$, particularly preferably $\geq 40$, very particularly preferably $\geq 45$ or $\geq 50$ (in the case of block polymers which are nonuniform with regard to the molecular weight, the statements made here are based on the number average values of the coefficients b, a, a' and a"). Advantageous two- and three-block polymers of the general formulae I and II are also those in which b $\geq 75$ or b $\geq 100$. Usually, b is $\leq 1000$ or $\leq 800$, in general $\leq 600$ and frequently $\leq 400$. The range from b $\geq 30$ to 40 is also of particular interest since its applications permits the preparation of finely divided aqueous polymer dispersions. This applies in particular when the basic units for the blocks A(A') and B are selected from the particularly preferred groups. The block B is advantageously chosen, with regard to its monomer composition and its length, so that, as an independent polymer, it has a glass transition temperature Tg of $\geq 20°$ C., preferably $\geq 40°$ C., particularly preferably $\geq 60°$ C., very particularly preferably $\geq 80°$ C. and even more preferably $\geq 100°$ C. Tg means the quasi-static glass transition temperature measured by means of DSC (differential scanning calorimetry, 20° C./min., midpoint) according to DIN 53765. The upper limits for Tg in the case of high molecular weights and homopolymeric blocks B are shown in, for example, Table 8 in Ullmann's Encyclopedia of Industrial Chemistry, VCH, Weinheim (1992), Vol. A21, page 169. It is not possible to make a generally valid statement with regard to the length of the blocks A which is required for solubilizing the blocks B and with regard to the question concerning the extent to which an aqueous micellar solution is obtainable by direct dissolution in water or only by indirect dissolution, but the answer can be obtained in the specific case by means of a few preliminary experiments. As a rule, micellar solubilization, required according to the invention in aqueous solution is possible in the case of the two-block polymers I when a is at least 40% or at least 50% of b. As a rule, a is at least 75% of b and frequently a is $\geq b$. a values of up to 2500 or more are possible.

In the case of three-block polymers II, the micellar solubilization, required according to the invention, in aqueous solution are possible in general when a' and a", independently of one another, are at least 20% or at least 25% of b, respectively. As a rule, they are at least 40% of b and frequently a' and a" are $\geq b/2$ or $\geq b$. a' and a", values of up to 2000 or more are possible.

However, if the ratio of a/b or (a'+a")/b is too great, the micellar aqueous solution generally converts into a molecular aqueous solution.

A direct micellar aqueous solution of the two- and three-block polymers of the general formulae I and II is frequently possible when the basic unit A is the salt of a monoethylenically unsaturated organic acid. If, on the other hand, the basic unit A is the free acid, it is as a rule necessary to use the method of indirect dissolution (initially dissolution in a mixture of water and an organic solvent, the latter advantageously being chosen so that the block B, as an independent polymer, would be soluble in this solvent; thereafter, gradual displacement of the organic solvent by means of dialysis and/or addition of water in combination with removal of the solvent by distillation). Frequently, direct micellar dissolution of the free acid in alkaline water is also possible.

Two- and three-block polymers of the general formulae I and II, whose hydrophilic blocks A have a polyelectrolyte character (i.e. not nonionic but dissociating into a polyion and opposite ions in an aqueous medium), are generally preferred as amphiphilic substances to be used according to the invention.

It is noteworthy that the micellar aqueous solutions of the amphiphilic substances to be added according to the invention solubilize monomers to be polymerized by the free radical aqueous emulsion polymerization method and having at least one vinyl group more selectively than the micellar aqueous solutions of the classical surfactants, i.e. when they are used for controlled free radical aqueous emulsion polymerizations, it is advisable to match with one another the hydrophobic micellar core and the monomers to be polymerized, i.e. to choose them so that they are chemically similar to one another. Accordingly, fluorine-containing hydrophobic blocks B are less preferable according to the invention.

Some individual examples of block polymers I and II which are suitable as amphiphilic substances to be added according to the invention are shown below. A d following in brackets indicates that the method of direct dissolution has been adopted for obtaining the not less than $10^{-4}$ molar micellar aqueous solution, while an i following in a corresponding manner indicates indirect solubilization (as a rule starting from dioxane/water mixtures):

$[\text{styrene}]_{260}$ $[\text{methacrylic acid}]_{385}$ (i)
$[\text{styrene}]_{381}$ $[\text{methacrylic acid}]_{320}$ (i)
$[\text{styrene}]_{233}$ $[\text{methacrylic acid}]_{240}$ (i)
$[\text{styrene}]_{333}$ $[\text{methacrylic acid}]_{268}$ (i)
$[\text{styrene}]_{317}$ $[\text{methacrylic acid}]_{256}$ (i)
$[\text{styrene}]_{211}$ $[\text{methacrylic acid}]_{209}$ (i)
$[\text{styrene}]_{230}$ $[\text{methacrylic acid}]_{244}$ (i)
$[\text{styrene}]_{202}$ $[\text{methacrylic acid}]_{314}$ (i)
$[\text{styrene}]_{327}$ $[\text{methacrylic acid}]_{267}$ (i)
$[\text{styrene}]_{346}$ $[\text{methacrylic acid}]_{442}$ (i)
$[\text{methacrylic acid}]_{52}$ $[\text{styrene}]_{73}$ $[\text{methacrylic acid}]_{52}$ (i)
$[\text{methacrylic acid}]_{93}$ $[\text{styrene}]_{212}$ $[\text{methacrylic acid}]_{93}$ (i)

[methacrylic acid]$_{132}$ [styrene]$_{301}$ [methacrylic acid]$_{132}$ (i)
[methacrylic acid]$_{174}$ [styrene]$_{529}$ [methacrylic acid]$_{174}$ (i)
[methacrylic acid]$_{132}$ [styrene]$_{604}$ [methacrylic acid]$_{132}$ (i)
[styrene]$_{40}$ [sodium acrylate]$_{82}$ (d)
[styrene]$_{40}$ [sodium acrylate]$_{180}$ (d)
[styrene]$_{40}$ [sodium acrylate]$_{520}$ (d)
[styrene]$_{40}$ [sodium acrylate]$_{2400}$ (d)
[styrene]$_{86}$ [sodium acrylate]$_{100}$ (d)
[styrene]$_{86}$ [sodium acrylate]$_{190}$ (d)
[styrene]$_{86}$ [sodium acrylate]$_{390}$ (d)
[styrene]$_{86}$ [sodium acrylate]$_{100}$ (d)
[styrene]$_{110}$ [sodium acrylate]$_{380}$ (d)
[styrene]$_{110}$ [sodium acrylate]$_{2400}$ (d)
[methyl methacrylate]$_{39}$ [sodium acrylate]$_{79}$ (d)
[methyl methacrylate]$_{82}$ [sodium acrylate]$_{82}$ (d)
[methyl methacrylate]$_{80}$ [sodium acrylate]$_{80}$ (d)
[methyl methacrylate]$_{79}$ [sodium acrylate]$_{86}$ (d)
[methyl methacrylate]$_{35}$ [sodium acrylate]$_{105}$ (d)
[methyl methacrylate]$_{36}$ [sodium acrylate]$_{33}$ (d)
[methyl methacrylate]$_{39}$ [sodium acrylate]$_{39}$ (d)
[methyl methacrylate]$_{31}$ [sodium acrylate]$_{110}$ (d)
[methyl methacrylate]$_{40}$ [sodium acrylate]$_{80}$ (d)
[methyl methacrylate]$_{49}$ [sodium acrylate]$_{88}$ (d)
[methyl methacrylate]$_{70}$ [sodium acrylate]$_{75}$ (d)
[methyl methacrylate]$_{620}$ [sodium acrylate]$_{620}$ (i, Tetrahydrofuran).

As stated above, the block polymers I and II which are suitable as amphiphilic substances to be added according to the invention are obtainable, for example, by the anionic sequential polymerization method (living polymers). Instead of the unsaturated organic acids, such as acrylic acid and methacrylic acid, frequently their tert-butyl esters are first copolymerized and then converted into the acid form by hydrolysis. In a similar manner, in some cases the anhydrides are also copolymerized instead of the acids and are subsequently hydrolyzed.

However, the preparation of the block polymers I and II is preferably carried out by the free radical sequential polymerization method, i.e. via pseudo-living free radical polymers, as described in U.S. Pat. No. 4,581,429, U.S. Pat. No. 5,322,912 and U.S. Pat. No. 5,412,047. The key to the procedure disclosed in these publications is to carry out the free radical polymerization in the presence of stable free radicals, e.g. N-oxyl radicals, which leads to polymers which can be reactivated to give free radical polymers and can thus continue to grow after the addition of further monomers.

Examples of such suitable N-oxyl free radicals are:
2,2,6,6-tetramethyl-1-pyrrolidinyloxy (TEMPO),
4-oxo-2,2,6,6-tetramethyl-1-piperidinyloxy (4-oxo-TEMPO),
4-hydroxy-2,2,6,6-tetramethyl-1-piperidinyloxy,
2,2,5,5-tetramethyl-1-pyrrolidinyloxy,
3-carboxy-2,2,5,5-tetramethylpyrrolidinyloxy and
di-tert-butyl nitroxide.

2,6-Diphenyl-2,6-dimethyl-1-piperidinyloxy and 2,5-diphenyl-2,5-dimethyl-1-pyrrolidinyloxy may also be used. Mixtures of the abovementioned compounds may of course also be employed.

The sequential free radical polymerization is carried out as a rule at elevated temperatures, advantageously at from 100 to 180° C., preferably from 110 to 175° C., in particular from 130 to 160° C. It may be carried out either in the absence of a solvent or in solution (or by the free radical aqueous emulsion polymerization method). The free radical polymerization is advantageously initiated by conventional free radical initiators having a short half-life, making it possible to obtain particularly low nonuniformities N (=ratio of weight average to number average molecular weight= $M_w/M_n$). Suitable conventional free racical initiators of this type include 2,4-dimethyl-2,5-dibenzyl peroxyhexane, tert-butyl peroxybenzoate, di-tert-butyl diperoxyphthalate, methyl ethyl ketone peroxide, dicumyl peroxide, tert-butyl peroxycrotonate, 2,2-bis-tert-butyl(peroxybutane), tert-butylperoxy isopropyl carbonate, 2,5-dimethyl-2,5-bis(benzoylperoxy)hexane, tert-butyl peracetate, 2,4-pentadiene peroxide, di-tert butyl peroxide, 2,5-dimethyl-2,5-di(tert-butylperoxy)hexyne, 2,5-dimethyl-2,5-di(tert-butylperoxy)hexane, preferably tert-butyl peroxy-2-ethyl hexanoate, tert-butyl peroxypivalate, tert-amyl peroxy-2-ethylhexanoate, azobisalkyl nitriles, such as azobisisobutylronitrile, and diaryl peroxides, such as dibenzoyl peroxide, and mixtures of the abovementioned compounds. Particularly suitable conventional free radical initiators to be used concomitantly are those having a half-life of about 1 hour at from 60 to 90° C. The molar ratio of N-oxyl free radical to conventional free radical initiator should be from 0.5 to 5, preferably from 0.8 to 4. Values from 1 to 3 or from 1 to 2, in general from 1 to 1.5, frequently from 1 to 1.2 and often from 1 to 1.1, can thus regularly be achieved for N. Block polymers having N values in the abovementioned ranges are generally suitable according to the invention.

Instead of starting from stable N-oxyl free radicals, it is also posible to start from compounds (for example the alkoxyamines of U.S. Pat. No. 4,581,429) which decompose, for example, under the action of heat with formation of a stable N-oxyl free radical and of a free radical polymerization initiator. Furthermore, such N-oxyl free radicals can be produced in situ from suitable compounds having an NO function (cf. column 5, line 60 et seq. of U.S. Pat. No. 4,581,429).

According to the invention, block polymers having a very uniform molecular weight are advantageous in that, in their micellar aqueous solutions, the micelles generally have an essentially uniform size, their use for controlled free radical aqueous emulsion polymerization facilitating the preparation of essentially monodisperse (with regard to the diameter of the disperse polymer particles) aqueous polymer dispersions.

Micellar aqueous solutions of the amphiphilic substances to be added according to the invention and having a broad micelle size distribution may be either used as such for controlled free radical aqueous emulsion polymerization (as a rule, aqueous polymer dispersions having a broader polymer particle diameter distribution then result) or (owing to their long life) fractionated beforehand according to their size in the analytical ultracentrifuge and can then be used according to the invention as portions monodisperse in this manner.

Another possible method of fractionation is flow-field-flow fractionation, which sorts according to the micellar hydrodynamic diameter. A description of this fractionation method is given in, for example, Anal. Chem. 64 (1992), 790–798. A measure of the quality of the fractionation is the ratio $M_w/M_n$. The micellar weight average molecular weight is given, for example, by classical light scattering, and the micellar number average molecular weight is obtainable, for example, by membrane osmometry.

The block polymers obtainable by sequential free radical polymerization according to U.S. Pat. No. 4,581,429, U.S. Pat. No. 5,322,912 and U.S. Pat. No. 5,412,047 have, as a rule, a terminal oxyamine group. For various reasons, elimination of the oxyamine groups may be desirable. In column 6, line 54 et seq., U.S. Pat. No. 4,581,429 offers various possible elimination methods of this type. Of particular interest according to the invention are those which lead to an —H, a hydroxyl group or an ethylenically unsaturated terminal group. The last method makes it possible to obtain ethylenically unsaturated block polymers (macromers) which are of interest according to the invention in that they are chemically bonded to the dispersed polymer particles in the course of the free radical aqueous emulsion polymerization. Very generally, the preparation of block polymers to be used according to the invention is carried out by initiated polymerization, preferably so that any hydrophobic initiator or moderator radical terminates the hydrophilic block. The hydrophobic block may of course also be terminated in this manner.

The novel process for the preparation of an aqueous polymer dispersion by polymerization of monomers having at least one vinyl group by the free radical aqueous emulsion polymerization method can be carried out in a simple manner by mixing a micellar aqueous solution of the amphiphilic substance to be added according to the invention, if required further aqueous dispersing medium, the monomers to be polymerized and the free radical polymerization initiator with one another in a polymerization vessel, heating the mixture to the polymerization temperature while stirring and maintaining the polymerization, while stirring, until the desired polymerization conversion is obtained.

The polymerization temperature is adapted to the characteristics of the dispersing medium and to the initiator system used and is usually from 20 to 100° C. It is often from 50 to 95° C. and frequently from 70 to 90° C.

The free radical aqueous emulsion polymerization is usually carried out at atmospheric pressure (1 atm). However, it may also be carried out under superatmospheric pressure, in particular when monomers which are gaseous at atmospheric pressure are used. In a corresponding manner, polymerization temperatures above 100° C. are also possible (e.g. up to 130° C.). The abovementioned conditions are also typical for the other free radical aqueous emulsion polymerization processes discussed in this publication. In the case of the emulsion polymerization method described, in which the total amount of the polymerization batch is initially taken in the polymerization vessel, the size of the resulting polymer particles is determined essentially by the type and amount of the amphiphilic substance contained in the batch and to be added according to the invention. With an increasing amount of the amphiphilic substance contained in the batch, smaller polymer particles are obtained, and vice versa. Doubling the amount of the relevant amphiphilic substance contained in the polymerization batch is usually associated with a doubling of the number of polymer particles formed and present as the disperse phase.

However, the disadvantage of the emulsion polymerization method described (total batch initially taken), is that it is suitable only for the preparation of aqueous polymer dispersions having a relatively low polymer content.

In the polymerization method in which the total batch is initially taken, for example, problems with regard to the technical controllability of the removal of the heat of reaction of the exothermic polymerization reaction occur at the polymer contents relevant in practice (as a rule >25% by weight).

On an industrial scale, the free radical aqueous emulsion polymerization is therefore carried out, as a rule, by the feed method, i.e. the predominant amount (as a rule from 50 to 100% by weight) of the monomers to be polymerized is added to the polymerization vessel at the rate of progress of the polymerization of the monomers already present in the polymerization vessel (polymerization conversion as a rule $\geq 80$ or $\geq 90$ or $\geq 95$ mol%). In order to control the particle size of the resulting aqueous polymer dispersion, according to the invention a micellar aqeous solution of the amphiphilic substance to be added according to the invention is initially taken in the polymerization vessel in the feed method. The ratio of initially taken micelles (and their type) to monomers to be polymerized essentially determines the size of the polymer particles in the resulting aqueous polymer dispersion. The smaller the initially taken micelles and the greater their number, the smaller are the resulting polymer particles with a given amount of monomer. If the initially taken number of micelles is increased several-fold, as a rule the number of polymer particles formed is multiplied in a corresponding manner in the novel procedure. In the feed method, preferably not more than up to 20% by weight of the monomers to be polymerized are initially additionally taken in the polymerization vessel. After the beginning of the free radical aqueous emulsion polymerization, the remaining monomers are fed in during the novel feed method so that, at any time during the feed, the polymerization conversion of all monomers added beforehand to the polymerization vessel is at least 80, preferably at least 90, mol %.

The manner in which the free radical initiator system is added to the polymerization vessel in the course of the novel free radical aqueous emulsion polymerization in the feed method tends to be of minor importance. The initiator system may be either initially taken in its entirety in the polymerization vessel or added continuously or stepwise at the rate at which it is consumed in the course of the novel feed method. Specifically, this depends, in the manner known per se to a person skilled in the art, both on the chemical nature of the initiator system and on the polymerization temperature.

If, in the course of the novel feed method, the amphiphilic substance to be added according to the invention is introduced into the polymerization vessel also or only during the monomer feed (i.e. initially taken mixture does not comprise the total amount of said amphiphilic substance), this generally effects a controlled broadening of the size distribution of the resulting polymer particles. Here too, the amphiphilic substance to be added according to the invention is preferably introduced in the form of a prepared micellar aqueous solution. For example, the feed methods of DE-A 42 13 969, DE-A 42 13 968, DE-A 42 13 967, DE-A 42 13 964 and DE-A 42 13 965 may be applied in an appropriately adapted manner in order to prepare correspondingly highly concentrated aqueous polymer dispersions. For this purpose, the aqueous starting dispersions to be used in the abovementioned laid-open applications should be replaced in a simple manner by corresponding novel micellar aqueous solutions.

Suitable free radical polymerization initiators for the novel process are all those which are capable of initiating a free radical emulsion polymerization. These may be both peroxides, for example alkali metal peroxodisulfates, and azo compounds. For polymerizations at low temperatures, combined systems which are composed of at least one organic reducing agent and at least one peroxide and/or hydroperoxide, e.g. tert-butyl hydroperoxide and the sodium salt of hydroxymethanesulfinic acid or hydrogen peroxide and ascorbic acid (as an electrolyte-free redox initiator system), are preferably used, very particularly preferably combined systems which additionally contain a small amount of a metal compound which is soluble in the polymerization medium and whose metallic component may occur in a plurality of valency states, e.g. ascorbic acid/iron (II) sulfate/hydrogen peroxide, the sodium salt of hydroxymethanesulfinic acid, sodium sulfite, sodium bisulfite or sodium disulfite also frequently being used instead of ascorbic acid, and tert-butyl hydroperoxide or an alkali metal peroxodisulfate and/or ammonium peroxodisulfate also frequently being used instead of hydrogen peroxide. Instead of a water-soluble iron(II) salt, a combination of water-soluble Fe/V salts is frequently used.

As a rule, the amount of free radical initiator systems used is from 0.1 to 2% by weight, based on the total amount of the monomers to be polymerized.

It is noteworthy that the novel process does not necessarily require the presence of additional dispersants in order to obtain an aqueous polymer dispersion of satisfactory stability. Such aqueous polymer dispersions which are free of further dispersants and are obtainable by the novel process are advantageous in that they have particularly little tendency to foam and a comparatively high surface tension.

However, conventional dispersants may of course be present in the novel process, for further stabilization of the disperse phase of the polymer particles produced. To maintain control over the novel process, however, it is preferable, when additional dispersants are present, to ensure that the amounts are such that the c.m.c. of these additional dispersants are not exceeded. It is frequently advisable to effect restabilization by the addition of conventional dispersants after the end of the novel free radical aqueous emulsion polymerization.

Examples of such conventional dispersants are the classical surfactants. Dowfax® 2A1 from Dow Chemical Company, ethoxylated mono-, di- and trialkylphenols (degree of ethoxylation: from 3 to 50, alkyl radical: $C_4$ to $C_9$), ethoxylated fatty alcohols (degree of ethoxylation: from 3 to 50, alkyl radical: $C_8$ to $C_{36}$) and alkali metal and ammonium salts of alkylsulfates (alkyl radical: $C_8$ to $C_{12}$), of sulfuric half-esters of ethoxylated alcohols (degree of ethoxylation: from 4 to 30, alkyl radical: $C_{12}$ to $C_{18}$) and ethoxylated alkyl phenols (degree of ethoxylation: from 3 to 50, alkyl radical: $C_4$ to $C_9$), of alkanesulfonic acids (alkyl radical: $C_{12}$ to $C_{18}$) and of alkylarylsulfonic acids (alkyl radical: $C_9$ to $C_{18}$) may be mentioned by way of example. Further suitable surfactants are described in Houben-Weyl, Methoden der organischen Chemie, Volume XIV/1, Makromolekulare Stoffe, Georg-Thieme Verlag, Stuttgart, 1961, pages 192 to 208. However, conventional protective colloids, such as polyvinyl alcohol, polyvinylpyrrolidone or amphiphilic block polymers having short hydrophobic blocks may also be used for costabilization, instead of, or as a mixture with, classical surfactants. As a rule, the amount of conventional dispersants present does not exceed 3 or 2% by weight, based on the monomers to be polymerized.

Monomers which are capable of free radical polymerization and are suitable for the novel process are in particular monoethylenically unsaturated monomers, such as olefins, e.g. ethylene, vinylaromatic monomers, such as styrene, a-methylstyrene, o-chlorostyrene or vinyltoluenes, vinyl and vinylidene halides, such as vinyl and vinylidene chloride, esters of vinyl alcohol and monocarboxylic acids of 1 to 18 carbon atoms, such as vinyl acetate, vinyl propionate, vinyl-n-butyrate, vinyl laurate and vinyl stearate, esters of α,β-monoethylenically unsaturated mono- and dicarboxylic acids of, preferably, 3 to 6 carbon atoms, in particular acrylic acid, methacrylic acid, maleic acid, fumaric acid and itaconic acid, with alkanols of, in general, 1 to 12, preferably 1 to 8, in particular 1 to 4, carbon atoms, in particular methyl, ethyl, n-butyl, iso-butyl and 2-ethylhexyl acrylate and methacrylate, dimethyl maleate or n-butyl maleate, nitriles of α,β-monoethylenically unsaturated carboxylic acids, such as acrylonitrile, and conjugated $C_4$–$C_8$-dienes, such as 1,3-butadiene and isoprene. As a rule, the stated monomers are the main monomers which together usually account for more than 50% by weight, based on the total amount of the monomers to be polymerized by the novel free radical aqueous emulsion polymerization method. Monomers which, when polymerized by themselves, usually give homopolymers which have a high water solubility are usually copolymerized only as modifying monomers in amounts of less than 50, as a rule, from 0.5 to 20, preferably from 1 to 10, % by weight, based on the total amount of the monomers to be polymerized.

Examples of such monomers are α,β-monoethylenically unsaturated mono- and dicarboxylic acids of 3 to 6 carbon atoms and their amides, e.g. acrylic acid, methacrylic acid, maleic acid, fumaric acid, itaconic acid, acrylamide and methacrylamide, and vinylsulfonic acid and its water-soluble salts and N-vinylpyrrolidone. Monomers which usually increase the internal strength of the films of the aqueous polymer dispersion are as a rule likewise copolymerized only in minor amounts, in general from 0.5 to 10% by weight, based on the total amount of monomers to be polymerized. Usually, such monomers have an epoxy, hydroxyl, N-methylol or carbonyl group or at least two nonconjugated ethylenically unsaturated double bonds. Examples of these are N-alkylolamides of α,β-monoethylenically unsaturated carboxylic acids of 3 to 10 carbon atoms and their esters with alcohols of 1 to 4 carbon atoms, among which N-methylolacrylamide and N-methylolmethacrylamide are very particularly preferred, silanized monomers, such as y-methacryloyloxypropylsilane or vinyl trimethoxysilane, monomers having two vinyl radicals, monomers having two vinylidene radicals and monomers having two alkenyl radicals. The diesters of dihydric alcohols with α,β-monoethylenically unsaturated monocarboxylic acids are particularly suitable, among which acrylic and methacrylic acid are once again preferably used. Examples of such monomers having two nonconjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate or triallyl cyanurate. Also of particular importance in this context are the hydroxy-$C_1$–$C_8$-alkyl esters of methacrylic and acrylic acid, such as hydroxyethyl, hydroxy-n-propyl or hydroxy-n-butyl acrylate and methacrylate, and compounds such ass diacetoneacrylamide and acetyl acetoxyethyl acrylate and methacrylate. In addition to monomers having unsaturated double bonds, molecular weight regulators, such as tert-dodecyl mercaptan and 3-mercaptopropyltrimethoxysilane, may be copolymerized in minor amounts, usually in an amount of from 0.01 to 2% by weight, based on the monomers to be polymerized. Such substances are preferably added to the polymerization zone as a mixture with the monomers to be polymerized.

In particular, monomer mixtures which can be subjected to free radical aqueous emulsion polymerization by the novel process in a controlled manner to give aqueous polymer dispersions are those which are composed of from 70 to 100% by weight of esters of acrylic and/or methacrylic acid with alkanols of 1 to 12 carbon atoms and/or styrene or from 70 to 100% by weight of vinyl chloride and/or vinylidene chloride or from 70 to 100% by weight of styrene and/or butadiene or from 40 to 100% by weight of vinyl acetate, vinyl propionate and/or ethylene the acrylate mixtures comprising in particular the following monomer compositions which consist of:

from 70 to 99% by weight of at least one ester of acrylic and/or methacrylic acid with alkanols of 1 to 8 carbon atoms, from 1 to 5% by weight of at least one monomer selected from the group consisting of acrylic acid, methacrylic acid and the $K^{\oplus}$, $Na^{\oplus}$ and ammonium salts of these acids and from 0 to 25% by weight of vinyl acetate, styrene or a mixture thereof.

Finally, it should once again be noted that the attractiveness of the amphiphilic substances to be added according to the invention as assistants for the free radical aqueous emulsion polymerization does not lie in an effect whereby the surface tension of the aqueous medium is reduced and the disperse phase thus stabilized. Rather, it is its controlling influence on the resulting number of dispersed polymer particles which is striking. The extent of its effect whereby it simultaneously stabilizes the disperse phase of the polymer particles produced, in spite of having little effect on the surface tension of the water, is surprising. It is noteworthy that the aqueous polymer dispersions resulting according to the invention are suitable both as binders (e.g. paper coating slips, interior coating materials, fibre mats) and as adhesives or additives in mineral, e.g. cement-containing, binders.

Of course, the novel process is usually carried out under an inert gas and with stirring. As a rule, the amount of amphiphilic substance added according to the invention is from 0.1 to 15, preferably from 0.5 to 6, % by weight, based on the monomers to be polymerized. If required, the number of micelles in the aqueous solution can be calculated from the micellar molecular weight (for example, determinable from the course of sedimentation in the analytical ultracentrifuge or by classical light scattering) and the sample weight, and the desired number of polymer particles thus established in advance.

Finally, it should be noted that the solids volume contentration of aqueous polymer dispersions obtainable according to the invention may be from 10 to 70 or from 25 to 70 or from 35 to 70 or from 45 to 70, % by volume. The resulting number average polymer particle diameter may be from 10 to 2000 nm, from 50 to 1500 nm, from 100 to 1000 nm, from 200 to 750 nm or from 300 to 500 nm.

It should also be noted that aqueous polymer dispersions obtainable according to the invention can be dried in a simple manner without additional assistants to give redispersible polymer powders (for example, by freeze drying or spray drying). This applies in particular when the glass transition temperature of the added amphiphilic substance is $\geq 60°$ C., preferably $\geq 70°$ C., particularly preferably $\geq 80°$ C. and very particularly preferably $\geq 90°$ C. or $\geq 100°$ C. Usually, it does not exceed 250° C.

EXAMPLES

1) Preparation of amphiphilic two-block polymers BP1 to BP6 by anionic polymerization (cf. Macromolecules 24 (1991), 4997)

a) Preparation of the initiator solution (initiator: diphenylhexyllithium)

Tetrahydrofuran (from Riedel de Haen, chromasolv) was dried by adding n-butyllithium (the end point was indicated by means of styrene; remaining, unhydrolyzed n-butyllithium initiates anionic polymerization of the styrene; the intense red color of the resulting styrene macroanions acts as an indicator) and degased by repeated application of reduced pressure. After the end of the drying, 90 ml of tetrahydrofuran were distilled off under reduced pressure and freed from final traces of $O_2$ by freezing, applying a vacuum and thawing, this procedure being carried out three times.

6 ml of n-butyllithium (as a 1.6 molar solution in hexane from Acros) was first dissolved in the 90 ml of anhydrous and oxygen-free tetrahydrofuran under an inert gas atmosphere to give a homogeneous solution. An equivalent amount (1.8 ml=10 mmol) of diphenylethylene (from Fluka, purum) was then added (dark red diphenylhexyllithium was immediately formed). The oxygen-free and anhydrous mixture was then shaken at 20° C. for a further 2 days with the exclusion of light. The content of initiator formed was finally determined by a test polymerization of methyl methacrylate and subsequent determination of the molecular weight of the resulting polymer by means of gel permeation chromatography.

b) Preparation of the monomers

I. Methyl methacrylate 30 g of methyl methacrylate were degased by repeated brief application of reduced pressure. For deactivation of protic impurities, triethylaluminum (as 15% strength by weight solution in hexane, from Fluka, purum) was then added until a marked yellow color occurred (this was the case after the addition of 2.4 ml of the hexane solution). Thereafter, reduced pressure was again applied briefly, and finally ⅔ of pure monomer were distilled off under reduced pressure and frozen, and reduced pressure was again applied.

II. tert-Butyl acrylate

A corresponding amount of tert-butyl acrylate was subjected to a procedure similar to that for the 30 g of methyl methacrylate. Finally, however, the tert-butyl acrylate was diluted to 3 times its volume with oxygen-free and anhydrous tetrahydrofuran. This tert-butyl acrylate/tetrahydrofuran solution was stored in the frozen state until use.

c) Anionic polymerization (oxygen-free and anhydrous)

1.5 g of anhydrous LiCl (improves the initiator quality by decomposing dimers, etc.) were initially taken in a polymerization vessel. 400 ml of tetrahydrofuran were then added with condensation, 66.35 g of the prepared initiator solution were added and the resulting mixture was cooled to just above the freezing point of tetrahydrofuran (−108.5° C.) by means of liquid nitrogen. 23 g of tert-butyl acrylate (as the prepared solution in tetrahydrofuran) were then added dropwise in the course of 2 minutes with vigorous stirring. The liquid mixture was kept at −78° C. for 15 minutes with stirring. 18 g of the prepared methyl methacrylate were then added dropwise with continued stirring in the course of 1 minute, and the reaction mixture was stirred for a further 15 minutes at −78° C. The anionic polymerization was then stopped by adding 5 ml of degased methanol to which a few drops of acetic acid had been added. The reaction mixture was then warmed up to room temperature, a part of the solvent was stripped off under reduced pressure and the block polymer formed was then precipitated in 1.5 l of a methanol/water mixture (in the volume ratio 2:1) and dried overnight at 50° C. in a drying oven under reduced pressure.

A 1:1 molar ratio of the starting monomers used was verified in the resulting block polymer by means of $^1$H-NMR (200 MHz) in a CDCl$_3$ solution. The relative number average molecular weight $M_n$ of the block polymer formed was determined as 8758 by means of gel permeation chromatography. The relative weight average molecular weight $M_W$ was 9957. The most frequent relative molecular weight was 9678. An average block polymer of

[tert-butyl acrylate]$_{39}$ [methyl methacrylate]$_{39}$ corresponds to this molecular weight.

d) Selective hydrolysis of the tert-butyl acrylate 20 g of the block polymer were dissolved in 100 ml of dioxane and stirred with 11 ml of 37% strength by weight aqueous HCl for 4 hours at 80° C. After cooling to 25° C., the resulting polymer was precipitated in n-heptane (GR, from Merck), filtered off, washed with n-heptane and then dried for 1 week at 80° C. in a drying oven under reduced pressure (in all other cases, isolation was effected by freeze drying from dioxane).

The selectivity and completeness of the hydrolysis was confirmed by means of $^1$H-NMR (200 MHz) in a CD$_3$OD solution.

A hydrophilic block polymer BP1

[acrylic acid]$_{39}$ [methyl methacrylate]$_{39}$ was thus obtained.

The following hydrophilic block polymers BP2 to BP7 were prepared in a corresponding manner:

BP2: [acrylic acid]$_{79}$ [methyl methacrylate]$_{39}$
BP3: [acrylic acid]$_{33}$ [methyl methacrylate]$_{36}$
BP4: [acrylic acid]$_{105}$ [methyl methacrylate]$_{35}$
BP5: [acrylic acid]$_{30}$ [methyl methacrylate]$_{28}$
BP6: [acrylic acid]$_{30}$ [methyl methacrylate]$_{25}$
BP7: [acrylic acid]$_{26}$ [methyl methacrylate]$_{18}$ The block polymer BP8 was additionally acquired from TH. Goldschmidt AG (=experimental product MA1007 from TH. Goldschmidt AG):

BP8: [methyl methacrylate]$_{10}$ [methacrylic acid]$_8$.

2) Determination of the surface tension of micellar aqueous solutions of the sodium salts of the two-block copolymers from 1)

The determinations of the surface tension were carried out using a ring tensiometer from Lauda (TElc) at 20° C. and 1 atm. The aqueous solutions investigated were directly obtainable. The results obtained are shown in Table 1 below.

TABLE 1

| Sodium salts of | Concentration (mol/l) | σ (mN/m) |
|---|---|---|
| BP8 | $1.96 \cdot 10^{-6}$ | 65.52 |
| BP8 | $2.94 \cdot 10^{-6}$ | 62.44 |
| BP8 | $5.88 \cdot 10^{-6}$ | 57.42 |
| BP8 | $9.79 \cdot 10^{-6}$ | 53 |
| BP8 | $1.47 \cdot 10^{-5}$ | 50.81 |
| BP8 | $2.44 \cdot 10^{-5}$ | 48.41 |
| BP8 | $3.90 \cdot 10^{-5}$ | 46.32 |
| BP8 | $6.11 \cdot 10^{-5}$ | 44.82 |

TABLE 1-continued

| Sodium salts of | Concentration (mol/l) | σ (mN/m) |
|---|---|---|
| BP8 | $9.64 \cdot 10^{-5}$ | 43.61 |
| BP8 | $1.51 \cdot 10^{-4}$ | 42.69 |
| BP8 | $2.36 \cdot 10^{-4}$ | 41.77 |
| BP8 | $3.66 \cdot 10^{-4}$ | 40.91 |
| BP8 | $5.60 \cdot 10^{-4}$ | 40.13 |
| BP8 | $8.40 \cdot 10^{-4}$ | 39.53 |
| BP8 | $1.23 \cdot 10^{-3}$ | 39.01 |
| BP8 | $1.74 \cdot 10^{-3}$ | 38.55 |
| BP8 | $2.35 \cdot 10^{-3}$ | 38.29 |
| BP8 | $3.02 \cdot 10^{-3}$ | 37.59 |
| BP1 | $4.90 \cdot 10^{-7}$ | 71.56 |
| BP1 | $7.35 \cdot 10^{-7}$ | 71.56 |
| BP1 | $1.47 \cdot 10^{-6}$ | 71.56 |
| BP1 | $2.45 \cdot 10^{-6}$ | 71.51 |
| BP1 | $3.67 \cdot 10^{-6}$ | 71.48 |
| BP1 | $6.10 \cdot 10^{-6}$ | 71.43 |
| BP1 | $9.74 \cdot 10^{-6}$ | 71.39 |
| BP1 | $1.53 \cdot 10^{-5}$ | 71.33 |
| BP1 | $2.41 \cdot 10^{-5}$ | 71.27 |
| BP1 | $3.77 \cdot 10^{-5}$ | 71.16 |
| BP1 | $5.90 \cdot 10^{-5}$ | 71.11 |
| BP1 | $9.15 \cdot 10^{-5}$ | 71.08 |
| BP1 | $1.40 \cdot 10^{-4}$ | 71.06 |
| BP1 | $2.10 \cdot 10^{-4}$ | 71.02 |
| BP1 | $3.07 \cdot 10^{-4}$ | 71.01 |
| BP1 | $4.34 \cdot 10^{-4}$ | 71 |
| BP1 | $5.87 \cdot 10^{-4}$ | 70.88 |
| BP1 | $7.54 \cdot 10^{-4}$ | 70.53 |
| BP2 | $5.2 \cdot 10^{-4}$ | 63.1 |
| BP3 | $1.3 \cdot 10^{-3}$ | 64.5 |
| BP4 | $4.5 \cdot 10^{-3}$ | 63.6 |
| BP5 | $1 \cdot 10^{-5}$ | 57.1 |
| BP6 | $1.1 \cdot 10^{-3}$ | 48.4 |
| BP7 | $1.4 \cdot 10^{-3}$ | 46.7 |

A graphical plot of the results is shown in FIG. 1. It shows that the sodium salts of BP8, BP7, BP6 and BP5 are not amphiphilic substances according to the invention. In particular, the sodium salt of BP8 behaves like a classical surfactant. The ammonium salts give results similar to those for the sodium salts.

3) Preparation of aqueous polymer dispersions D1 to D13 by the free radical aqueous emulsion polymerization method with the addition of NH$^\oplus_4$ salts of BP1 and BP8 as amphiphilic two-block polymers An ammoniacal solution of the block polymer was initially taken in the polymerization vessel, with or without the addition of water. Thereafter, the initially taken solution was heated to 90° C. and 30% by weight of a feed 2 were then added all at once. Two minutes later, the remaining amount of feed 2 was fed continuously (in the course of 2 hours) into the polymerization vessel and, beginning at the same time and spatially separately therefrom, a feed 1 was added continuously (in the course of 1 hour and 30 minutes) while maintaining the temperature of 90° C. After the end of the feeds, the polymerization mixture was stirred for a further hour at 90° C. and then cooled to room temperature. Essentially mono-disperse aqueous polymer dispersions were obtained, and they were characterized in the analytical ultracentrifuge by determining the d$_{50}$ values (50% by weight of the polymer has a particle diameter$\geq$d$_{50}$ and 50% by weight of the polymer has a particle diameter$\leq$d$_{50}$.

Tables 2 and 3 below show the compositions of initially taken solution, feed 1 and feed 2 and the d$_{50}$ values of the resulting aqueous polymer dispersions.

TABLE 2

| Initially taken solution | Solution of | D1 | D2 | D3 | D4 | D5 |
|---|---|---|---|---|---|---|
| | BP1 | 0.03 g | 0.15 g | 0.3 g | 1.5 g | 3 g |
| | NH$_3$ | 0.003 g | 0.015 g | 0.03 g | 0.15 g | 0.3 g |
| | Water | 1.47 g | 7.335 g | 14.67 g | 28.35 g | 56.7 g |
| | Water | 54 g | 48 g | 41 g | 25 g | — |
| Feed 1 | Methyl methacrylate | 15 g | 15 g | 15 g | 15 g | 15 g |
| | n-Butyl acrylate | 15 g | 15 g | 15 g | 15 g | 15 g |
| Feed 2 | Sodium peroxodisulfate | 0.15 g | 0.15 g | 0.15 g | 0.15 g | 0.15 g |
| | Water | 15 g | 15 g | 15 g | 15 g | 15 g |
| d50 (nm) | | 112 | 84 | 58 | 38 | 32 |

TABLE 3

| Initially taken solution | Solution of | D6 | D7 | D8 | D9 | D10 | D11 | D12 | D13 |
|---|---|---|---|---|---|---|---|---|---|
| | BP8 | 0.1 | 0.5 | 2 | 5 | 10 | 15 | 20 | 25 |
| | 25% strength by weight aqueous NH$_3$ solution | 3.2 | 3.2 | 6.4 | 6.4 | 6.4 | 6.4 | 6.4 | 6.4 |
| | Water | 177 | 178 | 181 | 188 | 200 | 211 | 223 | 235 |
| Feed 1 | Methyl methacrylate | 50 | 50 | 50 | 50 | 50 | 50 | 50 | 50 |
| | n-Butyl acrylate | 50 | 50 | 50 | 50 | 50 | 50 | 50 | 50 |
| Feed 2 | Water | 60 | 60 | 60 | 60 | 60 | 60 | 60 | 60 |
| | Sodium peroxodisulfate | 2 | 2 | 2 | 2 | 2 | 2 | 2 | 2 |
| d50 (nm) | | 157 | 129 | 103 | 86 | 40 | 31 | 26 | 26 |

For a predetermined amount of monomer and essentially complete polymerization conversion, the number of polymer particles formed is inversely proportional to the cube of the particle diameter.

Figure 2:
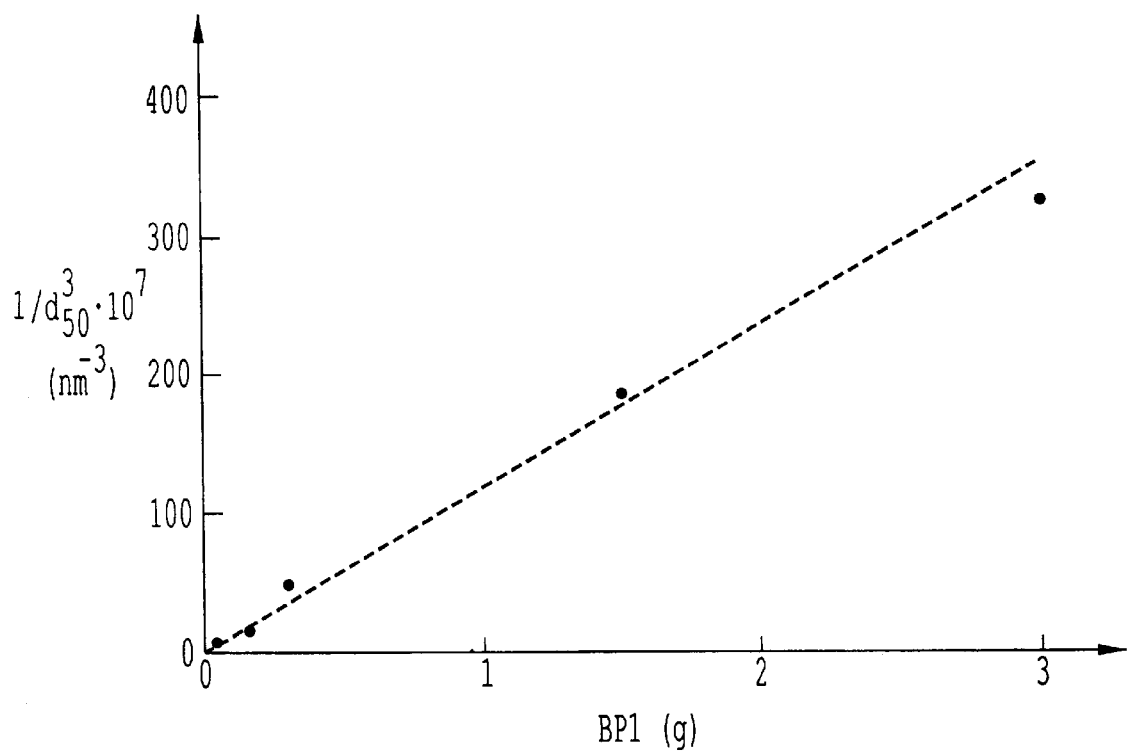
FIG. 2 illustrates a graphical plot of $(1/d^3_{50}) \cdot 10^7$ versus amount of BP1 added to the polymerization.
Figure 3:
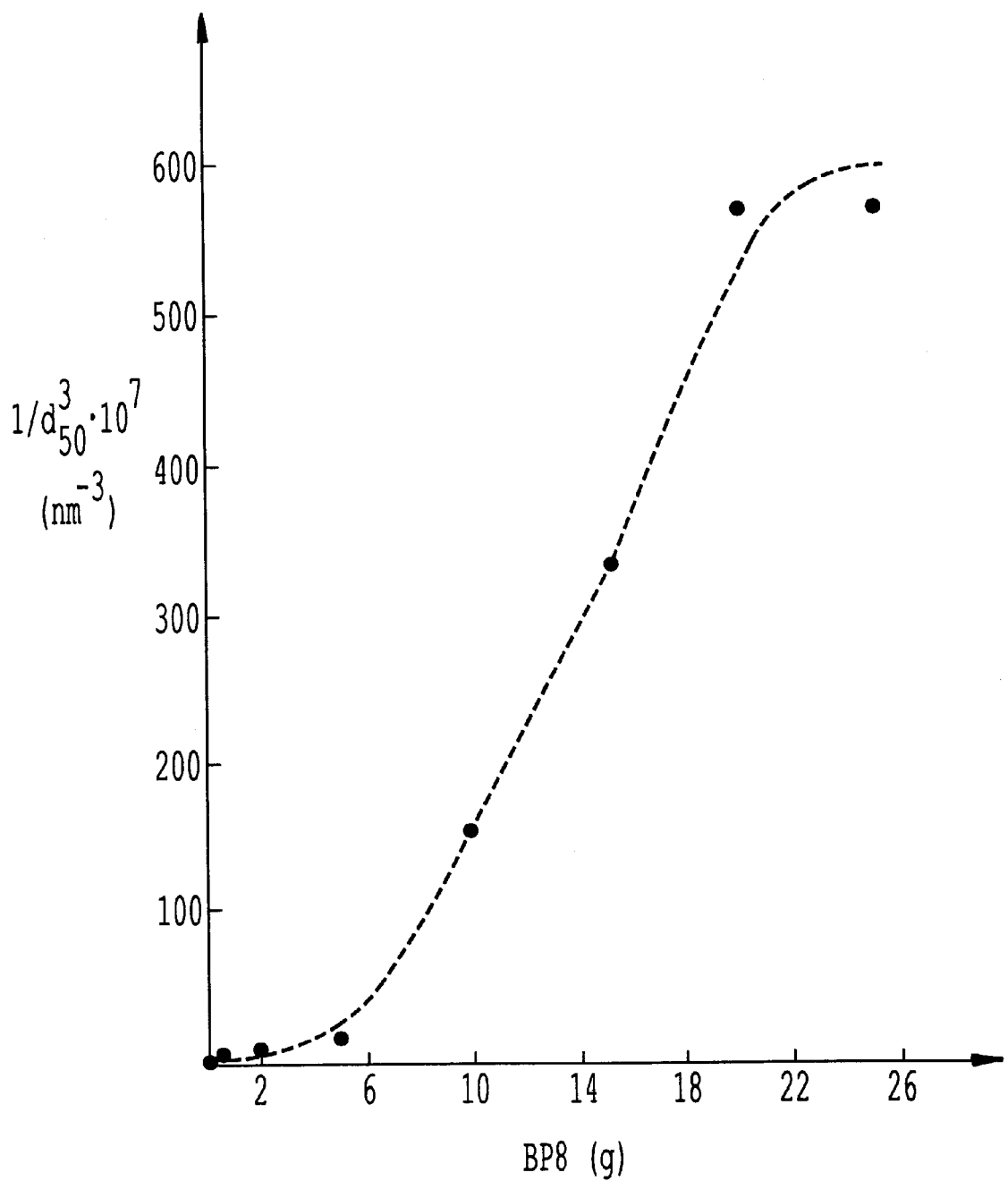
FIG. 3 illustrates a graphical plot of $(1/d^3_{50}) \cdot 10^7$ versus amount of BP8 added to the polymerization.

FIGS. 2 and 3 show a graphical plot of $(1/d^3_{50}) \cdot 10^7$ [nm$^{-3}$] for the d$_{50}$ values shown in Tables 2 and 3, as a function of the amount of BP1 or BP8 added to the polymerization.

While an essentially linear relationship is obtained in the case of the novel amphiphilic substance, FIG. 3 shows a virtually constant number of resulting polymer particles in the range of small added amounts of BP8. This is due to the fact that, although the initially taken number of micelles increases with an increasing amount of added BP8, said micelles are not quantitatively initiated but a part of them dissolve again, in the course of polymer particle formation, in the other part to stabilize the polymer particle growth therein (if the polymerizations were not carried out by the feed procedure but all components were intially taken in the mixture and then heated to the reaction temperature, essentially identical results would be obtained).

4) Investigations of aqueous solutions of the ammonium salt of BP1 and aqueous polymer dispersions containing this salt, using an analytical ultracentrifuge Aqueous solutions which each contained 6, 3, 2 or 1 g of BP1 per liter and 0.4 g of a 25% strength by weight aqueous NH$_3$ solution per gram of BP1 were investigated. Furthermore, the aqueous solutions investigated contained 0.1 mol of NH$_4$Cl per liter, in order to facilitate the dissociation of polyanion and ammonium ions in the centrifugal field. The temperature of the investigation was 20° C. In the sedimentation run (40000 revolutions per minute), only a monomodal schlieren peak occurred in all cases. The sedimentation rate was 7.2 Svedberg in all cases. The magnitude of the sedimentation rate showed that the units separating out must be aggregates of BP1 unimers and not BP1 unimers, indicating the micellar character of the aqueous solutions investigated. Since the schlieren peak comprised at least 98% of the amount of BP1 drawn in, these sedimentation runs showed that all micellar aqueous solutions contained less than 2% of the sample weight of BP1 in dissolved form. Investigtions by membrane osmometry confirmed this result (permeable cellulose acetate membrane of a relative molecular weight <10000) in that the osmotic pressure building up as a function of time did not pass through a maximum.

Figure 4A:
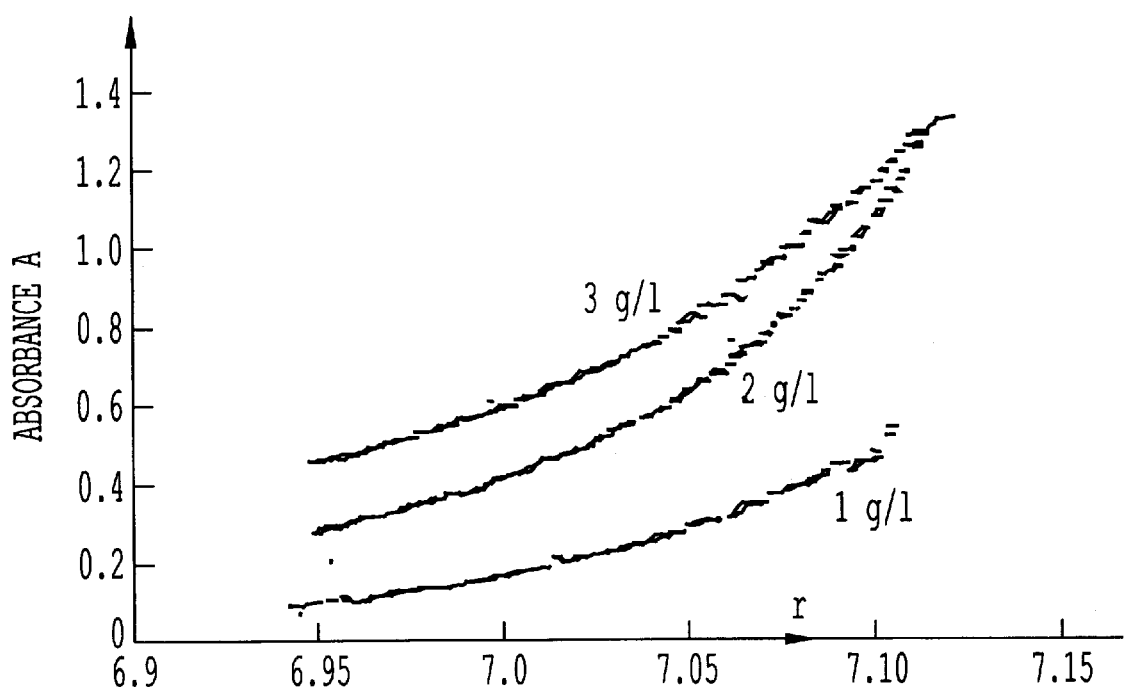
FIG. 4B illustrates the determination of apparent weight average molecular weight of units migrating in a centrifugal field as a function of the solution concentration from the exparential concentration curves of sedimentation-diffusion equilibrium runs.
Figure 4B:
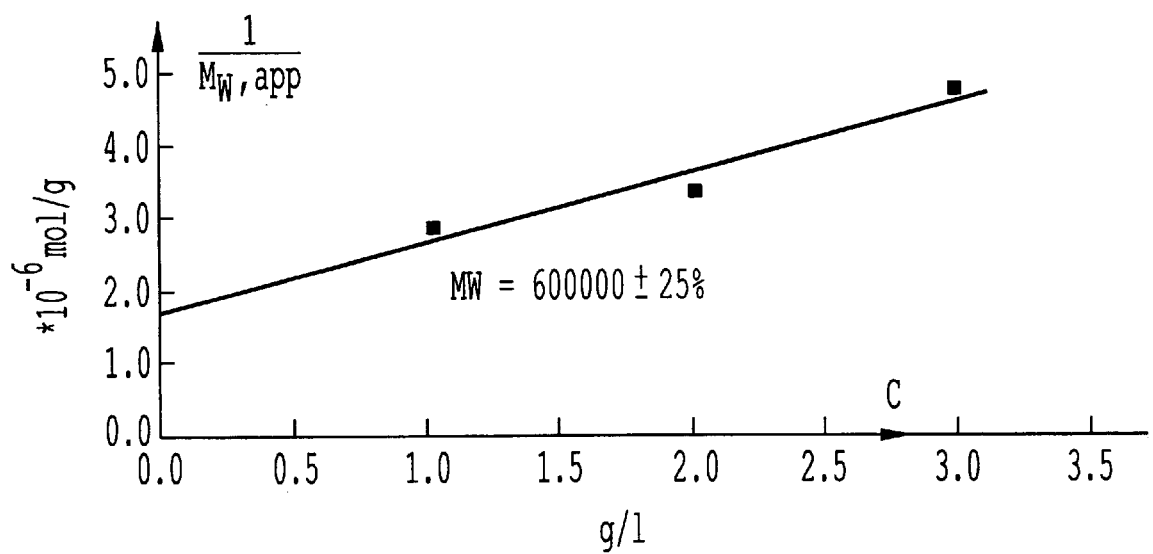

The apparent weight average molecular weight of the units migrating in the centrifugal field was determined as a function of the solution concentration from the exponential concentration curves of sedimentation-diffusion equilibrium runs carried out with the above-mentioned aqueous solutions (absorbence as a function of the micelle radius, λ=236 nm, 6000 revolutions per minute, 90 hours). The plot of the reciprocal values as a function of concentration gave a relative M$_W$ of the migrating unit of 600000±25% on linear extrapolation to the concentration 0 (cf. FIG. 4).

In sedimentation runs carried out in a corresponding manner with D5 (contains the largest amount of BP1) in a very wide range of dilutions, no free BP1 dissolved in unimer form was detectable. When D5 was dissolved in excess tetrahydrofuran and this solution was covered with a layer of pure tetrahydrofuran, the resulting Schlieren peak had a sedimentation rate of 0.9 Svedberg, indicating a relative molecular weight of the sedimenting unit of roughly 7000, which essentially corresponds to BP1 dissolved in unimer form.

When additional ammonium salt of BP1 was added to D5 and the mixture was left alone with gentle stirring at 20° C. for 40 hours, the Schlieren peak of the unimeric BP1 contained at least 99% of the subsequently added amount of BP1 even after this time, i.e. the amphiphilic block copolymer was not attracted to the dispersed polymer particles and its micellar solution was retained.

5) Experiment to determine the critical micellar formation concentration of the ammonium salt of BP1 in water at 20° C. and 1 atm by means of classical light scattering While FIG. 1 indicates a c.m.c. of just less than $10^{-4.5}$ mol/l for the sodium salt of BP8, the concentration-dependent surface tension measurement was not suitable for the c.m.c. determination in the case of the sodium salt of BP1. The determination thereof was therefore attempted by means of classical light scattering.

For this purpose, a stock solution of 1 g of BP1, 0.4 g of 25% strength by weight $NH_3$ solution and 300 g of water was prepared and was diluted by means of 0.1 molar aqueous $NH_4Cl$ solution. The difference in the scattering intensity (in the forward direction in the angle segment from 6 to 7°) between solvent and solution was determined as a function of the solution concentration of BP1, with a low-angle laser light-scattering photometer KMX-6 from Chromatix (USA), using an He/Ne laser ($k\lambda=633$ nm).

Figure 5:
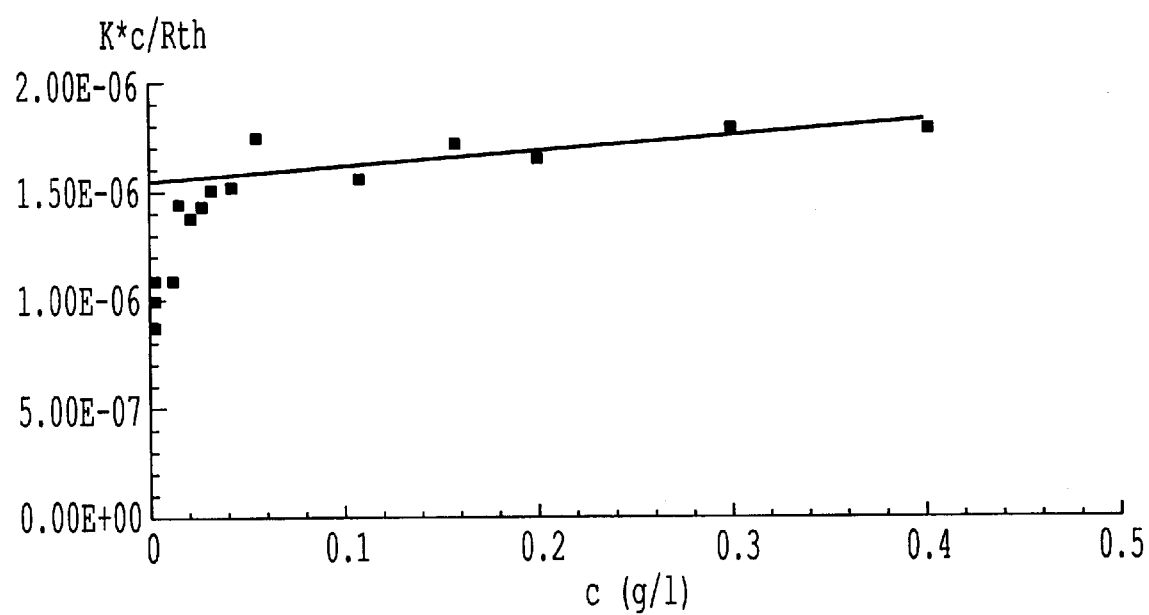
FIG. 5 illustrates a plot of the inverse values of scattering intensity differences as a function of the concentration.

FIG. 5 shows a plot of the inverse values of these scattering intensity differences as a function of the concentration.

The concentration-dependent curve shows (no deflection to higher inverse values with increasing dilution) that the c.m.c. is not reached even at a dilution of $10^{-7}$ mol/l. The extrapolation value determined in FIG. 5 by linear extrapolation to c=0 reflects a weight average relative molecular weight of 650000±10% and confirms the results obtained in the analytical ultracentrifuge.

6) Forster transfer measurements of the exchange of unimers between micelles

In order to investigate the exchange of [acrylic acid]$_i$ [methyl methacrylate]$_j$ two-block polymers in their micellar aqueous solutions at 20° C., two-block polymers of comparable composition were covalently marked on the one hand with the donor naphthaline and on the other hand with the acceptor pyrene:

[acrylic acid]$_{82}$ [methyl methacrylate-]$_{82}$-pyrene and
[acrylic acid]$_{86}$ [methyl methacrylate-]$_{79}$-naphthaline.

Aqueous solutions of the sodium salts of the two two-block polymers were then prepared (dissolve block polymer in NaOH-containing water), said solutions containing, in addition to water, the following per liter of solution:

200 mg of two-block polymer (calculated completely as acid) and 42.4 or 44.8 mg of NaOH.

Equal volumes of the two separately prepared aqueous solutions were mixed with one another in a cell of a flash fluorescence spectrometer (Edinburgh Instruments, FL 900 CDT, method of measurement: time-resolved single photon counting (TCSPC)). Time-resolved fluorescence decays (excitation wavelength: 290 nm (hydrogen (0.46 bar)-filled flash lamp), pulse duration: 1 ns, pulses/sec: 4000, detection wavelength (naphthaline): 340 nm) of the naphthaline donor showed no change within 20 hours. The same applied on heating at 80° C. for 2 hours.

7) Examples of further novel aqueous free radical emulsion polymerizations

The following two-block copolymers were prepared according to Example 1):

a) [acrylic acid]$_{30}$ [methyl methacrylate]$_{35}$
b) [acrylic acid]$_{80}$ [methyl methacrylate]$_{40}$
c) [methyl methacrylate]$_{49}$ [acrylic acid]$88$
d) [methyl methacrylate]$_{70}$ [acrylic acid]$_{75}$
e) [acrylic acid]$_{620}$ [methyl methacrylate]$_{620}$ The ammonium salts of the two-block copolymers a) to d) were used as follows for the free radical aqueous polymerization:

The monomers (as a mixture of 50% by weight of n-butyl acrylate and 50% by weight of methyl methacrylate), water, 0.5% by weight (based on the monomers) of sodium peroxodisulfate and X pphm (based on the weight of the monomers) of the abovementioned ammonium salts were mixed with one another, heated to the polymerization temperature of 90° C. while stirring and polymerized at this temperature to a conversion of >99% by weight (solids content chosen: 30% by weight). In all cases, aqueous polymer dispersions of sufficient stability were obtained.

The Xpphm used were:
1 pphm two-block copolymer a);
1 pphm two-block copolymer b);
2 pphm two-block copolymer b);
1 pphm two-block copolymer c);
2 pphm two-block copolymer c);
1 pphm two-block copolymer d);
2 pphm two-block copolymer d).

The light transmittance (indirect measure of the polymer particle size) of the aqueous polymer dispersions (path length: 2 cm, aqueous polymer dispersion diluted to a solids content of 0.01% by weight, 25° C., standardized to water (LD value=100), transmission of white light) was ≧91 in all cases.

100 mg of the two-block polymer e) were dissolved in tetrahydrofuran. Thereafter, an equivalent aqueous sodium hydroxide solution was added dropwise and the aqueous solution of the sodium salt of the two-block copolymer e) was produced by evaporating off the tetrahydrofuran. The solution was diluted to 20 g with water. Thereafter, 1 g of methyl methacrylate and 5 mg of $Na_2P_2O_8$ were added, the resulting mixture was heated to the polymerization temperature of 80° C. while stirring and polymerization was effected at this temperature to a conversion of >95% by weight. An aqueous polymer dispersion of satisfactory stability was obtained.

All polymerizations were reproducible in a satisfactory manner.

We claim:

1. A process for preparing an aqueous polymer dispersion by polymerizing monomers having at least one vinyl group by the free radical aqueous emulsion polymerization method, in which an amphiphilic substance is added to the polymerization vessel before or during the polymerization or both, wherein i) 1 l of water at 20° C. and 1 atm is capable of taking up at least $10^{-4}$ mol of the amphiphilic substance in micellar solution;

ii) the critical micelle formation concentration of the amphiphilic substance at 20° C. and 1 atm in water is $<10^{-6}$ mol/l; and iii) the surface tension of an aqueous or micellar solution or both of the amphiphilic substance in a molar concentration range ($0<C_m\leq10^{-4}$)mol/l at 20° C. and 1 atm does not fall below 60 mN/m;

wherein the amphiphilic substance is a two-block polymer of the formula (I) or (I'):

 (I)

 (I')

wherein:

- $[B]_b$ is a copolymer block or a homopolymer block comprising monomers selected from the group consisting of styrene, methyl styrene, chlorostyrene, vinyl esters of $C_1$–$C_8$ alkanecarboxylic acids, esters of an α,β-monoethylenically unsaturated carboxylic acid of 3 to 6 carbon atoms and a $C_1$–$C_8$-alkanol, butadiene and ethylene;
- $[A]_a$ is a copolymer block or a homopolymer block comprising monomers selected from the group consisting of α,β-monoethylenically unsaturated mono- and dicarboxylic acids of 3 to 6 carbon atoms, 2-acrylamido-2-methylpropanesulfonic acid, styrene sulfonic acid, vinylsulfonic acid and the alkali metal and ammonium salts of the abovementioned acids, N-vinylpyrrolidone, vinyl alcohol, ethylene glycol and propylene glycol,
- b is an integer which indicates the number of monomers contained in chemically bonded form in the polymer block $[B]_b$, b being $\geq 30$, and
- a is an integer whose magnitude is at least 40%, preferably at least 75%, of the magnitude of b and which indicates the number of monomers contained in chemically bonded form in the polymer block $[A]_a$.

2. The process as claimed in claim 1, wherein the critical micelle formation concentration of the amphiphilic substance at 20° C. and 1 atm in water is $\leq 10^{-6.25}$ mol/l.

3. The process as claimed in claim 1, wherein the critical micelle formation concentration of the amphiphilic substance at 20° C. and 1 atm in water is $\leq 10^{-6.5}$ mol/l.

4. The process as claimed in claim 1, wherein the critical micelle formation concentration of the amphiphilic substance at 20° C. and 1 atm in water is $\leq 10^{-6.75}$ mol/l.

5. The process as claimed in claim 1, wherein the critical micelle formation concentration of the amphiphilic substance at 20° C. and 1 atm in water is $\leq 10^{-7}$ mol/l.

6. The process as claimed in claim 1, wherein the critical micelle formation concentration of the amphiphilic substance at 20° C. and 1 atm in water is $\leq 10^{-7.25}$ mol/l.

7. The process as claimed in claim 1, wherein the critical micelle formation concentration of the amphiphilic substance at 20° C. and 1 atm in water is $\leq 10^{-7.5}$ mol/l.

8. The process as claimed in claim 1, wherein the surface tension σ of an aqueous molecular or micellar solution of the amphiphilic substance in the molar concentration range $(o<C_M \leq 10^{-4})$ mol/l at 20° C. and 1 atm does not fall below 62.5 mN/m.

9. The process as claimed in claim 1, wherein the surface tension σ of an aqueous molecular or micellar solution of the amphiphilic substance in the molar concentration range $(0<C_M \leq 10^{-4})$ mol/l at 20° C. and 1 atm does not fall below 65 mN/rn.

10. The process as claimed in claim 7, wherein the surface tension σ of an aqueous molecular or micellar solution of the amphiphilic substance in the molar concentration range $(0<C_M \leq 10^{-4})$ mol/l at 20° C. and 1 atm does not fall below 67.5 mN/r.

11. The process as claimed in claim 1, wherein the surface tension σ of an aqueous molecular or micellar solution of the amphiphilic substance in the molar concentration range $(0<C_M \leq 10^{-4})$ mol/l at 20° C. and 1 atm does not fall below 70 mN/m.

12. The process as claimed in claim 1, wherein the surface tension σ of an aqueous molecular or micellar solution of the amphiphilic substance in the molar concentration range $(0<C_M \leq 10^{-4})$ mol/l at 20° C. and 1 atm does not fall below 71.5 mN/m.

13. The process as claimed in claim 1, wherein 1 l of water at 20° C. and 1 atm is capable of taking up at least $10^{-3}$ mol of the amphiphilic substance in micellar solution.

14. The process as claimed in claim 1, wherein 1 l of water at 20° C. and 1 atm is capable of taking up at least $10^{-2}$ mol of the amphiphilic substance in micellar solution.

15. The process as claimed in claim 1, wherein 1 l of water at 20° C. and 1 atm is capable of taking up at least $10^{-1}$ mol of the amphiphilic substance in micellar solution.

16. The process as claimed in claim 1, wherein 1 l of water at 20° C. and 1 atm is capable of taking up at least 1 mole of the amphiphilic substance in micellar solution.

17. The process as claimed in claim 1, wherein the average residence time of a unimer within a micelle in a $10^{-5}$ molar micellar aqueous solution of the amphiphilic substance at 20° C. and 1 atm is at least 15 mi.

18. The process as claimed in claim 1, wherein the average residence time of a unimer within a micelle in a $10^{-5}$ molar micellar aqueous solution of the amphiphilic substance at 20° C. and 1 atm is at least 30 min.

19. The process as claimed in claim 1, wherein the average residence time of a unimer within a micelle in a $10^{-5}$ molar micellar aqueous solution of the amphiphilic substance at 20° C. and 1 atm is at least 1 hour.

20. The process as claimed in claim 1, wherein the average residence time of a unimer within a micelle in a $10^{-5}$ molar micellar aqueous solution of the amphiphilic substance at 20° C. and 1 atm is at least 10 hours.

21. The process as claimed in claim 1, wherein the average residence time of a unimer within a micelle in a $10^{-5}$ molar micellar aqueous solution of the amphiphilic substance at 20° C. and 1 atm is at least 20 hours.

22. The process as claimed in claim 1, wherein the amphiphilic substance is added as a preformed micellar solution.

23. The process as claimed in claim 22, wherein the amphiphilic substance is added as a preformed aqueous micellar solution.

24. The process as claimed in claim 23, wherein the preformed aqueous solution is a solution of frozen micelles.

25. The process as claimed in claim 1, wherein $[B]_b$ is a copolymer block or a homopolymer block comprising monomers selected from the group consisting of styrene, methylstyrene, chlorostyrene, vinyl acetate, vinyl propionate, methyl acrylate, ethyl acrylate, n-butyl acrylate, 2-ethylhexyl acrylate and methyl methacrylate.

26. The process as claimed in claim 25, wherein $[B]_b$ is a copolymer block or a homopolymer block comprising monomers selected from the group consisting of styrene, methyl methacrylate, n-butyl acrylate and 2-ethylhexyl acrylate.

27. The process as claimed in claim 26, wherein $[B]_b$ is a copolymer block or a homopolymer block comprising monomers selected from the group consisting of styrene and methyl methacrylate.

28. The process as claimed in claim 1, wherein $[A]_a$ is a copolymer block or a homopolymer block comprising monomers selected from the group consisting of acrylic acid, methacrylic acid, vinylsulfonic acid, 2-acrylamido-2-methylpropanesulfonic acid, and the $Na^\oplus$, $K^\oplus$, and $NH_4^\oplus$ salts thereof.

29. The process as claimed in claim 1, wherein $[A]_a$ is a copolymer block or a homopolymer block comprising monomers selected from the group consisting of acrylic acid, methacrylic acid, and the $K^\oplus$, $Na^\oplus$, and $NH_4^\oplus$ salts thereof.

30. The process as claimed in claim 1, wherein b is ≧35.
31. The process as claimed in claim 1, wherein b is ≧40.
32. The process as claimed in claim 1, wherein b is ≧45.
33. The process as claimed in claim 1, wherein b is ≧50.
34. The process as claimed in claim 1, wherein a is ≧b.
35. The process as claimed in claim 1, wherein the monomer mixture to be polymerized is composed of
   a) from 70 to 100% by weight of esters of acrylic or methacrylic acid or both with alkanols of 1 to 12 carbon atoms or styrene or both, or
   b) from 70 to 100% by weight of vinyl chloride or vinylidene chloride or both, or
   c) from 70 to 100% by weight of styrene or butadiene, or both, or
   d). from 40 to 100% by weight of vinyl acetate, vinyl propionate or ethylene or a combination thereof.
36. The process as claimed in claim 1, wherein the polymerization is carried out by the feed method.
37. The process as claimed in claim 1, wherein the total amount of the amphiphilic substance to be added is initially taken in the polymerization vessel.
38. The process as claimed in claim 1, wherein at least some of the amphiphilic substance to be added is not added until after the beginning of the polymerization.
39. An aqueous polymer dispersion obtained by a process as claimed in claim 1.
40. A two-block polymer of the formula I or I'

$[A]_a[B]_b$     (I)

$[B]_b[A]_a$     (I')

wherein:
   $[B]_b$ is a copolymer block or a homopolymer block comprising monomers selected from the group consisting of methylstyrene, chlorostyrene, vinyl esters of $C_1C_8$-alkanecarboxylic acids, esters of an α,β-monoethylenically unsaturated carboxylic acid of 3 to 6 carbon atoms and a $C_1$–$C_8$-alkanol, butadiene and ethylene,
   $[A]_a$ is a copolymer block or a homopolymer block comprising monomers selected from the group consisting of α,β-monoethylenically unsaturated mono- and dicarboxylic acids of 3 to 6 carbon atoms, 2-acrylamido-2-methylpropanesulfonic acid, styrene sulfonic acid, vinylsulfonic acid, the alkali metal and ammonium salts of the abovementioned acids, N-vinylpyrrolidone, vinyl alcohol, ethylene ,lycol and propylene glycol,
   b is an integer which indicates the number of monomers contained in chemically bonded form in the polymer block (B)b, b being ≧30, and
   a is an integer which indicates the number of monomers contained in chemically bonded form in the polymer block $[A]_a$, the magnitude of a being at least 40% of the magnitude of b.
41. The two-block polymer as claimed in claim 40, wherein
   $[B]_b$ is a copolymer block or a homopolymer block comprising monomers selected from the group consisting of esters of acrylic and methacrylic acid with $C_1$–$C_8$-alkanols, and
   $[A]_a$ is a copolymer block or a homopolymer block comprising monomers selected from the group consisting of acrylic acid, methacrylic acid and the alkali metal and ammonium salts of these acids.

42. The two-block polymer as claimed in claim 40, wherein $[A]_a$ or $[B]_b$ is a homopolymer block.
43. The two-block polymer as claimed in claim 40, wherein $[B]_b$ is polymethyl methacrylate.
44. The two-block polymer as claimed in claim 40, wherein $[A]_a$ is a homopolyrner block comprising acrylic acid, methacrylic acid, potassium acrylate, potassium menthacrylate, sodium acrylate, sodium methacrylate, ammonium acrylate or ammonium methacrylate.
45. The two-block polymer as claimed in claim 44, where 30≦b≦40 and a is at least 75% of b.
46. The two-block polymer as claimed in claim 40, obtainable by sequential anionic polymerization.
47. A two-block polymer of the formula (I) or (I'):

$[A]^a[B]_b$     (I)

$[B]_b[A]_a$     (I')

where
   $[B]_b$ is a copolymer block or a homopolymer block comprising monomers selected from the group consisting of styrene, methylstyrene, chlorostyrene, vinyl esters of $C_1$–$C_8$-alkanecarboxylic acids, esters of an a, p-monoethylenically unsaturated carboxylic acid of 3 to 6 carbon atoms and a $C_1$–$C_8$-alkanol, butadiene and ethylene,
   $[A]_a$ is a copolymer block or a homopolymer block comprising monomers selected from the group consisting of α,β-monoethylenically unsaturated mono- and dicarboxylic acids of 3 to 6 carbon atoms, 2-acrylamido-2-methylpropanesulfonic acid, styrene sulfonic acid, vinylsulfonic acid and the alkali metal and ammonium salts of the abovementioned acids,
   b is an integer which indicates the number of monomers contained in chemically bonded form in the polymer block $[B]_b$, b being ≧30, and
   a is an integer whose magnitude is at least 40% of the magnitude of b and which indicates the number of monomers contained in chemically bonded form in the polymer block $[A]_a$,
   obtainable by sequential free radical polymerization in the presence of N-oxyl free radicals.
48. A method of preparing an aqueous polymer dispersion, which comprises preparing said aqueous polymer dispersion with the two-block polymer as claimed in claim 40.
49. An aqueous polymer dispersion containing an amphiphilic substance, wherein
   i) 1 l of water at 20° C. and 1 atm is capable of taking up at least $10^{-4}$ mol of the amphiphilic substance in micellar solution;
   ii) the critical micelle formation concentration of the amphiphilic substance at 20° C. and 1 atm in water is $<10^{-6}$ mol/l ;and
   iii) the surface tension a of an aqueous and/or micellar solution of the amphiphilic substance in the molar concentration range $(0<C_M\leq 10^{-4})$ mol/l at 20° C. and 1 atm does not fall below 60 mN/m, and
   wherein the amphiphilic substance is a two-block polymer of the formula (I) or (I'):

$[A]_a[B]_b$     (I)

$[B]_b[A]_a$     (I')

wherein:

[B]$_b$ is a copolymer block or a homopolymer block comprising monomers selected from the group consisting of styrene, methylstyrene, chlorostyrenic, vinyl esters of $C_1$–$C_8$ alkanecarboxylic acids, esters of an α,β-monoethylenically unsaturated carboxylic acid of 3 to 6 carbon atoms and a $C_1$–$C_8$-alkanol, butadiene and ethylene,

[A]$_a$ is a copolymer block or a homopolymer block comprising monomers selected from the group consisting of α,β-monoethylenically unsaturated mono- and dicarboxylic acids of 3 to 6 carbon atoms, 2-acrylamido-2-methylpropanesulfonic acid, styrene sulfonic acid, vinylsulfonic acid and the alkali metal and ammonium salts of the abovementioned acids, N-vinylpyrrolidone, vinyl alcohol, ethylene glycol and propylene glycol, b is an integer which indicates the number of monomers contained in chemically bonded form in the polymer block [B]$_b$, b being $\geq 30$, and a is an integer whose magnitude is at least 40%, preferably at least 75%, of the magnitude of b and which indicates the number of monomers contained in chemically bonded form in the polymer block [A]$_a$.

50. A polymer powder obtainable by drying an aqueous polymer dispersion as claimed in claim 49.

51. A polymer powder obtainable by drying an aqueous polymer dispersion as claimed in claim 39.

52. A method of preparing an aqueous polymer dispersion, which comprises preparing said aqueous polymer dispersion with the two-block polymer as claimed in claim 40.

* * * * *